(12) United States Patent
Pereira et al.

(10) Patent No.: US 10,632,378 B2
(45) Date of Patent: *Apr. 28, 2020

(54) BANDWIDTH MANAGEMENT DURING SIMULTANEOUS SERVER-TO-CLIENT TRANSFER OF DIFFERENT TYPES OF DATA

(71) Applicant: Sony Interactive Entertainment America LLC, San Mateo, CA (US)

(72) Inventors: Rui Filipe Andrade Pereira, Aliso Viejo, CA (US); David Perry, Monarch Beach, CA (US); Andrew Buchanan Gault, Foster City, CA (US)

(73) Assignee: Sony Interactive Entertainment America LLC, San Mateo, CA (US)

( * ) Notice: Subject to any disclaimer, the term of this patent is extended or adjusted under 35 U.S.C. 154(b) by 273 days.

This patent is subject to a terminal disclaimer.

(21) Appl. No.: 15/370,928

(22) Filed: Dec. 6, 2016

(65) Prior Publication Data

US 2017/0080337 A1    Mar. 23, 2017

Related U.S. Application Data

(63) Continuation of application No. 13/826,744, filed on Mar. 14, 2013, now Pat. No. 9,511,288, which is a
(Continued)

(51) Int. Cl.
*A63F 13/355* (2014.01)
*A63F 13/352* (2014.01)
(Continued)

(52) U.S. Cl.
CPC .............. *A63F 13/355* (2014.09); *A63F 9/24* (2013.01); *A63F 13/335* (2014.09); *A63F 13/35* (2014.09); *A63F 13/352* (2014.09); *A63F 13/358* (2014.09); *A63F 13/77* (2014.09); *A63F 13/86* (2014.09); *H04L 47/365* (2013.01); *H04L 65/601* (2013.01); *H04L 65/80* (2013.01);
(Continued)

(58) Field of Classification Search
CPC ............. H04N 21/235; H04N 21/6332; H04N 12/1489; A63F 13/358; H04L 67/42; H04L 65/80; H04L 65/601; H04L 47/365; H04L 67/38
See application file for complete search history.

(56) References Cited

U.S. PATENT DOCUMENTS

| | | | | |
|---|---|---|---|---|
| 2003/0100307 A1* | 5/2003 | Wolochow | ............ | H04W 48/18 455/440 |
| 2008/0098100 A1* | 4/2008 | Zimmerman | ........... | H04L 67/06 709/222 |

(Continued)

FOREIGN PATENT DOCUMENTS

WO    WO-9708641 A2 *    3/1997    .............    A63F 13/10

*Primary Examiner* — Robert T Clarke, Jr.
(74) *Attorney, Agent, or Firm* — Penilla IP, APC

(57) ABSTRACT

A determination is made, using a computer, of an amount of game code data to be included in a data packet containing streaming game video data. A data packet is generated to contain the streaming game video data and to include the amount of game code data. The generated data packet is transmitted from a server computer system to a client computer system.

20 Claims, 8 Drawing Sheets

Related U.S. Application Data continuation of application No. 13/231,862, filed on Sep. 13, 2011, now Pat. No. 9,211,473, which is a continuation-in-part of application No. 12/826,130, filed on Jun. 29, 2010, now Pat. No. 8,968,087, and a continuation-in-part of application No. 12/826,489, filed on Jun. 29, 2010, now Pat. No. 8,888,592, which is a continuation-in-part of application No. 12/791,819, filed on Jun. 1, 2010, now Pat. No. 9,584,575, said application No. 12/826,130 is a continuation-in-part of application No. 12/791,819, filed on Jun. 1, 2010, now Pat. No. 9,584,575, said application No. 13/231,862 is a continuation-in-part of application No. 12/334,819, filed on Dec. 15, 2008, now Pat. No. 8,147,339.

(60) Provisional application No. 61/421,175, filed on Dec. 8, 2010, provisional application No. 61/421,163, filed on Dec. 8, 2010, provisional application No. 61/407,898, filed on Oct. 28, 2010, provisional application No. 61/382,470, filed on Sep. 13, 2010, provisional application No. 61/354,699, filed on Jun. 14, 2010, provisional application No. 61/345,534, filed on May 17, 2010, provisional application No. 61/323,354, filed on Apr. 12, 2010, provisional application No. 61/183,088, filed on Jun. 2, 2009, provisional application No. 61/183,546, filed on Jun. 2, 2009, provisional application No. 61/183,035, filed on Jun. 1, 2009, provisional application No. 61/183,037, filed on Jun. 1, 2009, provisional application No. 61/014,036, filed on Dec. 15, 2007.

(51) Int. Cl.
*A63F 13/335* (2014.01)
*A63F 13/35* (2014.01)
*A63F 13/86* (2014.01)
*A63F 13/358* (2014.01)
*A63F 13/77* (2014.01)
*A63F 9/24* (2006.01)
*H04L 29/06* (2006.01)
*H04L 12/805* (2013.01)
*A63F 13/33* (2014.01)

(52) U.S. Cl.
CPC .............. *H04L 67/38* (2013.01); *H04L 67/42* (2013.01); *A63F 13/33* (2014.09)

(56) References Cited

U.S. PATENT DOCUMENTS

| | | | |
|---|---|---|---|
| 2008/0144505 A1* | 6/2008 | Isnardi | H04L 1/0083 370/235 |
| 2010/0121972 A1* | 5/2010 | Samuels | H04L 41/082 709/231 |
| 2014/0074913 A1* | 3/2014 | Claydon | H04L 67/42 709/203 |

* cited by examiner

BANDWIDTH MANAGEMENT DURING SIMULTANEOUS SERVER-TO-CLIENT TRANSFER OF DIFFERENT TYPES OF DATA

CLAIM OF PRIORITY

This application is a continuation application under 35 U.S.C. 120 of prior U.S. application Ser. No. 13/826,744, filed Mar. 14, 2013, which is a continuation application under 35 U.S.C. 120 of prior U.S. application Ser. No. 13/231,862, filed Sep. 13, 2011, issued as U.S. Pat. No. 9,211,473, on Dec. 15, 2015, which:

1) claims priority under 35 U.S.C. 119 to U.S. Provisional Patent Application No. 61/382,470, filed Sep. 13, 2010,
2) claims priority under 35 U.S.C. 119 to U.S. Provisional Patent Application No. 61/407,898, filed Oct. 28, 2010,
3) claims priority under 35 U.S.C. 119 to U.S. Provisional Patent Application No. 61/421,175, filed Dec. 8, 2010,
4) claims priority under 35 U.S.C. 119 to U.S. Provisional Patent Application No. 61/421,163, filed Dec. 8, 2010,
5) is a continuation-in-part under 35 U.S.C. 120 of U.S. patent application Ser. No. 12/334,819, filed Dec. 15, 2008, issued as U.S. Pat. No. 8,147,339 on Apr. 3, 2012, which claims priority under 35 U.S.C. 119 to U.S. Provisional Patent Application No. 61/014,036, filed on Dec. 15, 2007,
6) is a continuation-in-part under 35 U.S.C. 120 of U.S. patent application Ser. No. 12/826,130, filed Jun. 29, 2010, issued as U.S. Pat. No. 8,968,087, on Mar. 3, 2015, which:
   a) claims priority under 35 U.S.C. 119 to U.S. Provisional Patent Application No. 61/354,699, filed on Jun. 14, 2010, and
   b) is a continuation-in-part under 35 U.S.C. 120 of U.S. patent application Ser. No. 12/791,819, filed Jun. 1, 2010, which:
      1. claims priority under 35 U.S.C. 119 to U.S. Provisional Patent Application No. 61/183,037, filed Jun. 1, 2009,
      2. claims priority under 35 U.S.C. 119 to U.S. Provisional Patent Application No. 61/183,035, filed Jun. 1, 2009,
      3. claims priority under 35 U.S.C. 119 to U.S. Provisional Patent Application No. 61/183,546, filed Jun. 2, 2009,
      4. claims priority under 35 U.S.C. 119 to U.S. Provisional Patent Application No. 61/183,088, filed Jun. 2, 2009,
      5. claims priority under 35 U.S.C. 119 to U.S. Provisional Patent Application No. 61/323,354, filed Apr. 12, 2010,
      6. claims priority under 35 U.S.C. 119 to U.S. Provisional Patent Application No. 61/345,534, filed May 17, 2010,
7) is a continuation-in-part under 35 U.S.C. 120 of U.S. patent application Ser. No. 12/826,489, filed Jun. 29, 2010, issued as U.S. Pat. No. 8,888,592, on Nov. 18, 2014, which:
   a) claims priority under 35 U.S.C. 119 to U.S. Provisional Patent Application No. 61/354,699, filed on Jun. 14, 2010, and
   b) is a continuation-in-part under 35 U.S.C. 120 of U.S. patent application Ser. No. 12/791,819, filed Jun. 1, 2010, which:
      1. claims priority under 35 U.S.C. 119 to U.S. Provisional Patent Application No. 61/183,037, filed Jun. 1, 2009,
      2. claims priority under 35 U.S.C. 119 to U.S. Provisional Patent Application No. 61/183,035, filed Jun. 1, 2009,
      3. claims priority under 35 U.S.C. 119 to U.S. Provisional Patent Application No. 61/183,546, filed Jun. 2, 2009,
      4. claims priority under 35 U.S.C. 119 to U.S. Provisional Patent Application No. 61/183,088, filed Jun. 2, 2009,
      5. claims priority under 35 U.S.C. 119 to U.S. Provisional Patent Application No. 61/323,354, filed Apr. 12, 2010,
      6. claims priority under 35 U.S.C. 119 to U.S. Provisional Patent Application No. 61/345,534, filed May 17, 2010.

Each of the above-identified U.S. Patent Applications and U.S. Provisional Patent Applications is incorporated herein by reference in its entirety.

BACKGROUND

Field of the Invention

The invention is in the field of computer programming and specifically in the field of server side execution of computer programs.

Related Art

Execution of computer programs can generally occur using one of two approaches. In one model the computer program is executed on a single device where input is received from a user, such as a game player, and program output is presented to the user. In the other model program execution occurs on a remote server under the control of one or more clients. A user provides inputs at the client and receives program output for display at the client. Communication between the client and the server takes place over a communication network, such as the internet.

It is possible that program execution can be distributed between both a client and a server. For example, in multiplayer video games it is common for a server to maintain a global state of a game based on inputs from many clients, and for each client to render separate video responsive to game rules and part of the global state. This requires that a software client of the video game be installed on the client.

SUMMARY

In one embodiment, a method is disclosed for server-to-client transmission of game code. The method includes determining, using a computer, an amount of game code data to be included in a data packet containing streaming game video data. The method also includes generating the data packet containing the streaming game video data and including the amount of game code data. The method further includes transmitting the data packet from a server computer system to a client computer system.

In another embodiment, a method is disclosed for server-to-client transmission of game code. The method includes determining, using a computer, a total amount of communication bandwidth available to transmit data from a server computer system to a client computer system. The method also includes determining, using the computer, an amount of communication bandwidth required for transmission of streaming game video from the server computer system to the client computer system to provide a minimum required quality level of game video at the client computer system. The method also includes determining, using the computer, an amount of communication bandwidth available for transmission of game code to the client computer system by subtracting the amount of communication bandwidth required for transmission of streaming game video from the total amount of communication bandwidth. The method also includes transmitting data packets containing streaming game video from the server computer system to the client computer system, in accordance with the amount of communication bandwidth required for transmission of streaming game video to provide the minimum required quality level of game video at the client computer system. The method also includes transmitting data packets containing game code from the server computer system to the client computer system, in accordance with the amount of communication bandwidth available for transmission of game code.

In another embodiment, a non-transitory computer readable medium having program instructions stored thereon for implementing a method for server-to-client transmission of game code is disclosed. The non-transitory computer readable medium includes program instructions for directing a computer to determine an amount of game code data to be included in a data packet containing streaming game video data. The non-transitory computer readable medium also includes program instructions for directing the computer to generate the data packet containing the streaming game video data and including the amount of game code data. The non-transitory computer readable medium also includes program instructions for directing the computer to transmit the data packet from a server computer system to a client computer system.

A dual mode model of program execution is used to provide both immediate execution (play) of a game and also client-side rendering of video. Essentially immediate execution is achieved by initially rendering video on a server and providing the rendered video to the client over a communication network such as the internet. Client side game logic and related content are downloaded to the client in parallel with or following the rendered video. When all or a sufficient fraction of the client side software is received by the client, the mode of program execution is changed such that rendering of video occurs on the client rather than or in addition to the server.

Essentially immediate execution is achieved because server side game logic and related components can be provisioned quickly or before a request is received to play a game. The output of the server side game logic includes a video stream rendered on the server in response to received game commands, a game state and a game player's point of view. This video stream is communicated to the client where it is presented to the game player in real-time. To accomplish this, the only logic required on the client is that needed to receive, decode and display the video stream.

Various embodiments of the invention include a game system comprising a video source configured to provide a streaming video to a first client geographically remote from the video source, the streaming video being generated at the video source and being based on a state of a computer program (e.g., computer game state), and a download manager configured to download executable code and other components of the computer program from a code source to the first client via a network while the streaming video is being provided to the first client from the video source.

These embodiments optionally further comprise a state source configured to provide the state of the computer program to the first client.

Various embodiments of the invention include a game server comprising an input, a game engine, transition logic, state storage, and an output. The input is configured to receive game commands from a plurality of geographically remote clients, and the game engine is configured to maintain a global state of a video game based on the received game commands, and to provide different subsets of the global state of the video game to different members of the plurality of clients, each of the subsets being assigned to a particular member of the plurality of clients respectively. The transition logic is configured to reassign one of the subsets of the global state from a first member of the plurality of clients to a second member of the plurality of clients, the state storage is configured to store the global state, and the output is configured to provide the subsets of the global states to the plurality of clients over the internet.

Various embodiments of the invention include a method of providing a computer game, the method comprising executing game logic on a video server, where the execution of the game logic results in rendering of a video stream based on a game state. The method further comprises providing the video stream from the video server to a client over a communication network, and providing executable game content to the client in parallel with the video stream, the executable game content being configured to generate video based on the game state.

Additionally, the game logic and related content (e.g., content used by the game logic) can be divided into parts, and these parts can be downloaded in essentially any order from the game system to the client. In various embodiments the parts are downloaded in an order that is based on the probabilities that the ongoing game play may require those parts. For example, if, in view of the current state of the game, a particular part of the client side game logic (and other content) is likely to be required to support further game play, then that part will be given high priority in a download sequence. The download sequence is optionally updated dynamically, responsive to the game play, and parts of the game logic and related content are downloaded to the client in parallel with streaming video until the amount of the game logic and related content downloaded to the client is deemed to be sufficiently to support game play on the client side in the client side mode. At that point game play can be transitioned to the client, streaming video ceases, and downloading of the game code can completed. After streaming video to the client ends, the remaining parts of the game code can continue to be dynamically ordered, and downloaded to the client according to that order, responsive to the game state. Optionally, if the complete game code has not been downloaded, and the game state unexpectedly requires a part of the game code that has not yet been downloaded, the game play can transition back to the server side mode.

Various embodiments of the invention include a game system comprising a video source and a download manager. The video source is configured to provide a streaming video to a client geographically remote from the video source, the streaming video being generated at the video source responsive to a present state of a computer program. The download manager is configured to dynamically determine, responsive to the present state of the computer program, a download sequence of a plurality of parts of an executable code and other components (jointly "executable content" or "executable game content") of the computer program. The download manager is further configured to download parts of the executable content according to the download sequence, from a code source to the client via a network, while the streaming video is being provided to the client from the video source. In various embodiments the video source includes the download manager. In various embodiments, the download manager is configured to dynamically determine the download sequence by determining the probabilities of other states of the computer program based on the current state of the computer program. In some of these embodiments, the game system further comprises a computer-readable medium that stores a probability tree database, and the computer-readable medium is in communication with the download manager. In these embodiments the download manager is further configured to determine the probabilities of other states of the computer program based on the current state of the computer program by querying the probability tree database. In various embodiments the game system further comprises a statistics engine configured to maintain the probability tree database.

Various embodiments of the invention include a method of providing a computer game. In these embodiments the method comprises executing game logic on a video server in a server side mode of game execution to render a video stream based on a game state and providing the video stream from the video server to a client over a communication network. The method further comprises dynamically determining, responsive to the game state, a download sequence of a plurality of parts of an executable game content, the executable game content being configured to generate video based on the game state, and providing the parts of the executable game content to the client in parallel with the video stream according to the download sequence. In various embodiments dynamically determining the download sequence includes querying a probability tree database. In various embodiments the method further comprises determining a download rate for providing the parts of the executable game content to the client, and in some of these embodiments determining the download rate includes monitoring a bandwidth of a communication channel to the client. In various embodiments, the method further comprises initiating a transition from the server side mode of game execution to a client side mode of game execution in which game logic is executed on the client to render the video stream based on the game state. In some of these embodiments the method further comprises providing the parts of the executable game content to the client after initiating the transition, and in still further embodiments providing the parts of the executable game content to the client after initiating the transition can be performed according to the download sequence. In still further embodiments, after initiating the transition, the method further comprises dynamically determining the download sequence responsive to the game state.

DETAILED DESCRIPTION

Various embodiments of the invention include simultaneously downloading executable game logic and streaming game video to the same client, and/or transitioning from a server side mode of game execution to a client side mode of game execution. These processes potentially involve several parties and systems. A video server system is configured to provide streaming video to a client via a network in response to game rules and received game commands. A download manager is configured to provide executable game logic and related content to the client in parallel with the provision of the streaming video. The client is configured to receive the executable game logic and content while displaying the streaming game video to a game player. Optionally, a game server is configured to maintain a global game state of a multiplayer video game and to provide subsets of this game state to the video server system as well as other clients of the game server. The executable game logic can be provided by the game server, the video server system, or a third party system.

The server side mode is characterized by rendering of game video on a video server and provision of the rendered video to a geographically remote client. In this mode the game video is responsive to game commands received at the video server from the client via a communication network. The client side mode is characterized by rendering of game video on the client responsive to game commands entered locally to the client. The server side mode and the client side mode are not necessarily mutually exclusive. Game video is optionally rendered at both the video server and the client and displayed on the client in parallel or sequentially.

Transition logic configured for managing the transition between server side mode and client side mode is optionally distributed among the above devices. For example, on the client the transition logic can be configured to terminate display of the streaming game video, receive a copy of a local game state, and/or initiate execution of the received executable game logic. On the video server system the transition logic can be configured to terminate delivery of the streaming game video, provide the copy of the local game state to the client, determine when sufficient executable game logic has been provided to the client to initiate the transition, and/or determine an order in which the executable game logic should be provided to the client. On the game server transition logic can be configured to redirect the communications, including game commands and game state, between the video server system and the game server such that these communications occur between the game server and the client. Further features of the transition logic are discussed elsewhere herein.

Figure 1:
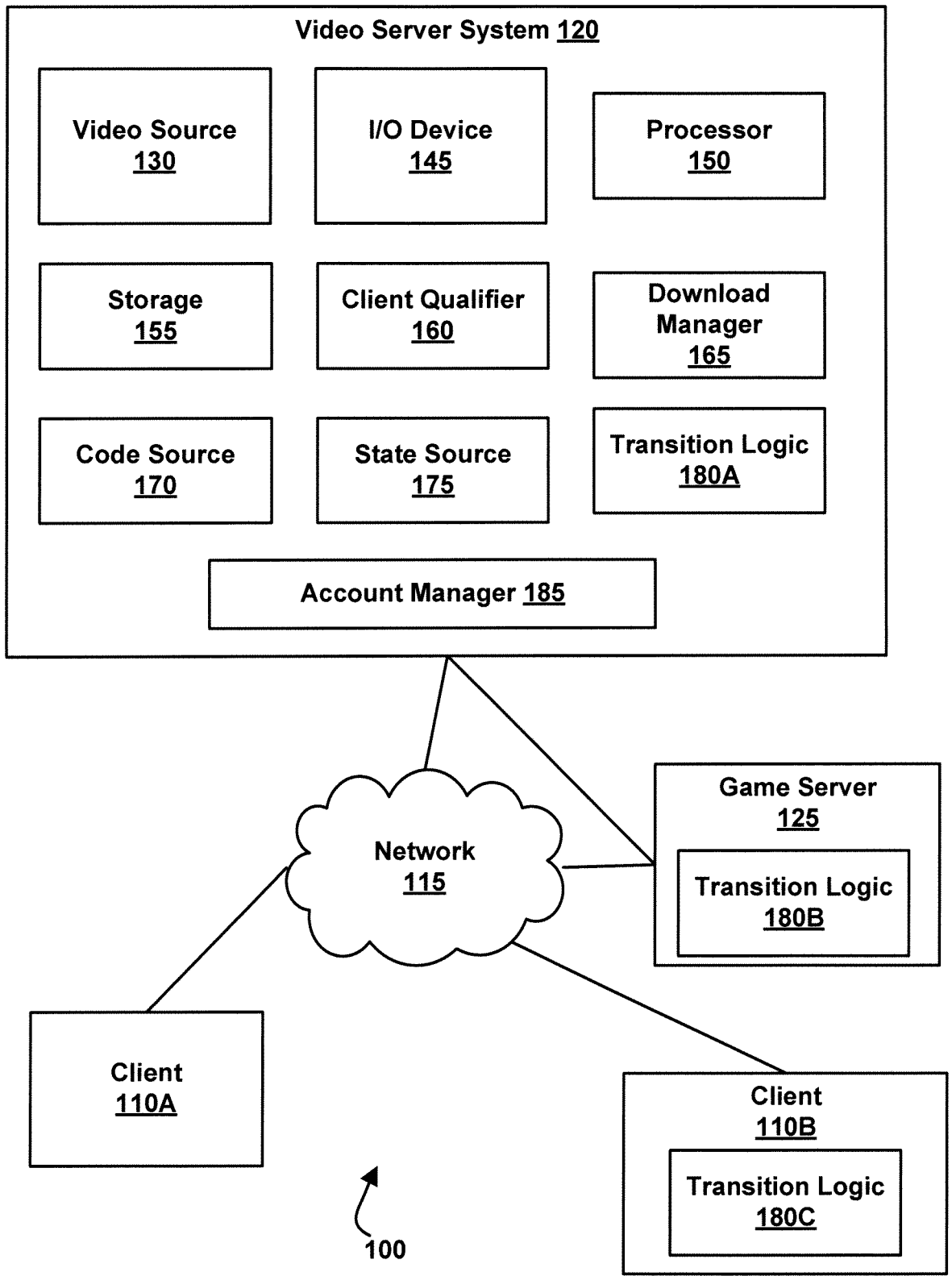
FIG. 1 illustrates a game system, according to various embodiments of the invention.

FIG. 1 illustrates a Game System 100 configured to execute a computer program, according to various embodiments of the invention. Game System 100 is configured to provide a video stream to one or more Clients 110 via a Network 115. Game System 100 typically includes a Video Server System 120 and an optional Game Server 125. Video Server System 120 is configured to provide the video stream to the one or more Clients 110 with a minimal quality of service. For example, Video Server System 120 may receive a game command that changes the state of, or a point of view within, a video game, and provide Clients 110 with an updated video stream reflecting this change in state with minimal latency. The Video Server System 120 may be configured to provide the video stream in a wide variety of alternative video formats, including formats yet to be defined. Further, the video stream may include video frames configured for presentation to a game player at a wide variety of frame rates. Typical frame rates are 30 frames per second, 60 frames per second, and 120 frames per second, although higher or lower frame rates are included in alternative embodiments of the invention. In some embodiments, Video Server System 120 is configured to provide three dimensional video data, e.g., matched video streams rendered from points of view separated by the distance between a person's eyes.

Clients 110, referred to herein individually as 110A, 110B, etc., may include terminals, personal computers, game consoles, tablet computers, telephones, televisions, set top boxes, kiosks, wireless devices, digital pads, stand-alone devices, handheld game playing devices, and/or the like. Typically, Clients 110 are configured to receive encoded video streams, decode the video streams, and present the resulting video to a game player, e.g., a player of a game. The processes of receiving encoded video streams and/or decoding the video streams optionally includes storing individual video frames in a receive buffer of the client. The video streams may be presented to the game player on a display integral to Client 110 or on a separate device such as a monitor or television. Clients 110 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 110 are optionally geographically dispersed. The number of clients included in Game System 100 may vary widely from one or two to thousands, tens of thousands, or more. As used herein, the term "game player" is used to refer to a person that plays a game and the term "game playing device" is used to refer to a device used to play a game.

Clients 110 are configured to receive video streams via Network 115. Network 115 may be any type of communication network between computing devices including, a telephone network, the Internet, wireless networks, power line networks, local area networks, wide area networks, private networks, and/or the like. Network 115 explicitly does not include communication channels completely within a computing device, such as a motherboard bus. In typical embodiments, the video streams are communicated via standard protocols, such as TCP/IP or UDP/IP. Alternatively, the video streams are communicated via proprietary standards.

A typical example of Clients 110 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 110 may, but are not required to, further include systems configured for modifying received video. For example, a client may be configured to perform further rendering, to overlay one video image on another video image, to crop a video image, and/or the like. Clients 110 may be configured to receive various types of video frames, such as I-frames, P-frames and B-frames, and to process these frames into images for display to a game player. In some embodiments, one or more members of Clients 110 are configured to perform further rendering, shading, conversion to 3-D, or like operations on the video stream. A member of Clients 110 is optionally configured to receive more than one audio or video stream. Input devices of Clients 110 may include, for example, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 110 is generated and provided by Video Server System 120. As is described further elsewhere herein, this video stream includes video frames (and the audio stream includes audio frames). The video frames are configured (e.g., they include pixel information in an appropriate data structure) to contribute meaningfully to the images displayed to the game player. A meaningful contribution is a contribution that is readily observable by a game player. As used herein, the term "video frames" is used to refer to frames including predominantly information that is configured to contribute to, e.g. to effect, the images shown to the game player. Most of the teachings herein with regard to "video frames" can also be applied to "audio frames." Clients 110 may be configured to receive more than one video stream at the same time. For example, Client 110B may be configured to receive a matched pair of video streams configured to form a three dimensional image when one of the streams is presented to one eye and the other stream is presented to the other eye. Client 110B is optionally configured to receive a first video stream from a first source, a second video stream from a second source, and to overlay these two video streams for presentation to a game player.

Clients 110 are typically configured to receive inputs from a game player. These inputs may include game commands configured to change the state of the video game or otherwise affect game play. The game commands can be received using input devices and/or may be automatically generated by computing instructions executing on Clients 110. The received game commands are communicated from Clients 110 via Network 115 to Video Server System 120 and/or Game Server 125. For example, in some embodiments, the game commands are communicated to Game Server 125 via Video Server System 120. In some embodiments, separate copies of the game commands are communicated from Clients 110 to Game Server 125 and Video Server System 120. The communication of game commands is optionally dependent on the identity of the command. Game commands are optionally communicated from Client 110B through a different route or communication channel that that used to provide audio or video streams to Client 110B. For example, a game command can be received from a wireless device such as a cellular telephone and the audio and/or video streams can be provided to a display such as a television set. The wireless device and the display do not need to communicate directly. In this example, Client 110B comprises two separate devices. The commands from the cellular telephone may pass through a cellular telephone network or a wireless router.

In various embodiments, Clients 110 are configured to communicate add-on data between each of Client 100 and Video Server System 120, or between different members of Clients 110. For example, an add-on that enables voice communication directly between clients can include the communication of audio data between clients. Add-on data that augments the functionality of a server side computer program may be stored on one of Clients 110 for use by a server side add-on or for use by a client side add-on. Add-on data may also be stored on Video Server System 120 or a separate add-on server, and be used by add-ons located on one of Clients 110, Video Server System 120 or the add-on server.

Game Server 125 is optionally operated by a different entity than Video Server System 120. For example, Game Server 125 may be operated by the publisher of a multi-player game. In this example, Video Server System 120 is optionally viewed as a client by Game Server 125 and optionally configured to appear from the point of view of Game Server 125 to be a prior art client executing a prior art game engine. Communication between Video Server System 120 and Game Server 125 can occur via Network 115. As such, Game Server 125 can be a prior art multiplayer game server that sends game state information to multiple clients, one of which is Video Server System 120. Video Server System 120 may be configured to communicate with multiple instances of Game Server 125 at the same time. For example, Video Server System 120 can be configured to provide a plurality of different video games to different game players. Each of these different video games may be supported by a different Game Server 125 and/or published by different entities. In some embodiments, several geographically distributed instances of Video Server System 120 are configured to provide game video to a plurality of different game players. Each of these instances of Video Server System 120 may be in communication with the same instance of Game Server 125. Communication between Video Server System 120 and one or more Game Server 125 optionally occurs via a dedicated communication channel. For example, Video Server System 120 may be connected to Game Server 125 via a high bandwidth channel that is dedicated to communication between these two systems.

Video Server System 120 comprises at least a Video Source 130, an I/O Device 145, a Processor 150, and non-transitory Storage 155. Video Server System 120 may consist of one computing device or be distributed among a plurality of computing devices. These computing devices are optionally connected via a communications system such as a local area network.

Video Source 130 is configured to provide a video stream, e.g., streaming video or a series of video frames that form a moving picture. In some embodiments Video Source 130 is also configured to provide an audio stream. In some embodiments, Video Source 130 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects. The game state is typically maintained based on game rules, as well as game commands such as move, turn, attack, set focus to, interact, use, and/or the like. Part of the game engine is optionally disposed within Game Server 125. Game Server 125 may maintain a copy of the state of the game based on game commands received from multiple players using geographically disperse clients. In these cases, the game state is provided by Game Server 125 to Video Source 130, wherein a copy of the game state is stored and rendering is performed. Game Server 125 may receive game commands directly from Clients 110 via Network 115, and/or may receive game commands via Video Server System 120.

Video Source 130 typically includes rendering logic, e.g., hardware, firmware, and/or software stored on a computer readable medium such as Storage 155. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 110. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and an "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative embodiments Video Source 130 includes a video recording device such as a camera. This camera may be used to generate delayed or live video that can be included in the video stream of a computer game. The resulting video stream optionally includes both rendered images and images recorded using a still or video camera. Video Source 130 may also include storage devices configured to store previously recorded video to be included in a video stream. Video Source 130 may also include motion or positioning sensing devices configured to detect motion or position of an object, e.g., person, and logic configured to determine a game state or produce video-based on the detected motion and/or position.

Video Source 130 is optionally configured to provide overlays configured to be placed on other video. For example, these overlays may include a command interface, login instructions, video frames rendered from another game player's point of view, messages to a game player, images of other game players, video feeds of other game players (e.g., webcam video). In embodiments of Client 110B that include a touch screen interface, the overlay may include a virtual keyboard, joystick, touch pad, and/or the like. In one example of an overlay a player's voice is overlaid on an audio stream. Video Source 130 optionally further includes one or more audio sources.

In embodiments wherein Video Server System 120 is configured to maintain the game state based on input from more than one player, each player may have a different point of view comprising a position and direction of view. Video Source 130 is optionally configured to provide a separate video stream for each player based on their point of view. Further, Video Source 130 may be configured to provide a different frame size, frame data size, and/or encoding to each of Client 110. Video Source 130 is optionally configured to provide 3-D video.

I/O Device 145 is configured for Video Server System 120 to send and/or receive information such as video, commands, add-ons, add-on data, requests for information, a game state, client identities, player identities, game commands, security information, audio data, and/or the like. I/O Device 145 typically includes communication hardware such as a network card or modem. I/O Device 145 is configured to communicate with Game Server 125, Network 115, and/or Clients 110. I/O Device 145 is configured to receive the information from more than one of Clients 110. I/O Device 145 is optionally configured to receive the information as packets using a standard such as TCP or UDP.

Video Server System 120 optionally further comprises a Client Qualifier 160. Client Qualifier 160 is configured for remotely determining the capabilities of a client, such as Clients 110A or 110B. These capabilities can include both the capabilities of Client 110B itself as well as the capabilities of one or more communication channels between Client 110B and Video Server System 120. For example, Client Qualifier 160 may be configured to test a communication channel through Network 115.

Client Qualifier 160 can determine (e.g., discover) the capabilities of Client 110B manually or automatically. Manual determination includes communicating with a game player of Client 110B and asking the game player to provide capabilities. For example, in some embodiments, Client Qualifier 160 is configured to display images, text, and/or the like within a browser of Client 110B. The displayed objects represent request that the game player enter information such as operating system, processor, video decoder type, type of network connection, display resolution, etc. of Client 110B. The information entered by the game player is communicated back to Client Qualifier 160.

Automatic determination may occur, for example, by execution of an agent on Client 110B and/or by sending test video to Client 110B. The agent may comprise computing instructions, such as java script, embedded in a web page or installed as an add-on. The agent is optionally provided by Client Qualifier 160. In various embodiments, the agent can find out processing power of Client 110B, decoding and display capabilities of Client 110B, lag time reliability and bandwidth of communication channels between Client 110B and Video Server System 120, a display type of Client 110B, firewalls present on Client 110B, hardware of Client 110B, software executing on Client 110B, registry entries within Client 110B, whether Client 110B is connected via a wireless router, and/or the like.

Client Qualifier 160 includes hardware, firmware, and/or software stored on a computer readable medium. Client Qualifier 160 is optionally disposed on a computing device separate from one or more other elements of Video Server System 120. For example, in some embodiments, Client Qualifier 160 is configured to determine the characteristics of communication channels between Clients 110 and more than one instance of Video Server System 120. In these embodiments the information discovered by Client Qualifier 160 can be used to determine which instance of Video Server System 120 is best suited for delivery of streaming video to one of Clients 110.

Download Manager 165 is configured to manage the downloading of executable game content to Client 110B. This downloading occurs in parallel with the display to a game player of game video provided by Video Source 130 to Client 110B. More than one of Clients 110 may each simultaneously receive both streaming game video and executable game content. Downloading code parallel to streaming video means that packets of executable game content are communicated to Client 110B at the same time as, or between packets of, the streaming game video. Download Manager 165 includes hardware, firmware and/or software stored on a computer readable medium, and Download Manager 165 can be distributed among one or more devices. The executable game content is configured for execution on Client 110B and, when executed, to generate video, based on a game environment, for display to a game player.

In some embodiments, both game video and executable game content are provided to Client 110B in a same data packet. For example, a packet may include a video frame (of one of the various possible types) and data that is part of the executable game content. The executable game content is optionally inserted into the packet by Encoder 225A or Post Processor 260 prior to delivery to I/O Device 145. In some embodiments, Encoder 225A or Post Processor 260 is configured to examine packets including a video frame, calculate how much more data can be placed in the packet, and insert executable game content to fill remaining space in the packet. A preferred packet size is optionally used to make this calculation. At Client 110B the packet is parsed and the video frame is decoded separately from the executable game content.

Download Manager 165 manages the downloading of executable game content in part by controlling the rate, e.g., Mbits/second, at which the executable game content is downloaded. This rate is dependent on the size of the data packets including the game code and the frequency at which these data packets are sent. Either of these factors can be varied to select a rate. The rate is selected based on 1) the available bandwidth of the communication channel between Video Server System 120 and Client 110B, and 2) the fraction of this bandwidth used to provide the streaming game video. For example, if the bandwidth of the communication channel is 15 Mb/sec and 10 Mb/sec is required to provide the streaming game video at a desired quality, then the rate at which the executable game content is downloaded will be limited to 5 Mb/sec. Generally, if X Mb/sec bandwidth is available and Y Mb/sec is used for the streaming video, Download Manager 165 will limit the rate at which the executable content is downloaded to be less than (X-Y) Mb/sec. Download Manager 165 will reduce the rate at which the executable game content is downloaded, relative to a maximum possible rate, so that the streaming game video is received by client 110B with the desired level of quality, e.g., a desired reliability at a given resolution, color depth, and frame size, etc. Communicating the streaming video is given priority over downloading the executable game content.

Because the bandwidth of the communication channels between Video Server System 120 and different members of Clients 110 can have different bandwidths, the rate at which the same executable game content is downloaded to these different members of Clients 110 can be different. Further, even if communication channels have the same bandwidths, the rates at which executable game content is downloaded may be different if the rates at which streaming game video is downloaded to each of the Clients 110 are different. For example, if Client 110A receives streaming video of a first frame size and Client 110B receives streaming video of a second frame size, the rate at which they received executable game content can be different even if their respective communication channels have the same bandwidth.

The rate at which executable game content is downloaded from Video Server System 120 to Client 110B can be dynamically varied over time. For example, if the bandwidth of the communication channel drops, Download Manager 165 may reduce the rate at which executable game content is downloaded to Client 110B in response to this drop. The drop in bandwidth is sometimes detected by monitoring for lost packets. In some embodiments, Download Manager 165 is configured to automatically reduce the rate at which the executable game content is downloaded if executable game content packets and/or streaming video packets are lost. The rate at which the streaming game video is communicated can be held constant, while the rate at which executable game content is downloaded is reduced. For example, if reducing the rate at which streaming game video is communicated would cause the quality of the video presented to a game player to drop below a minimum quality, then the rate at which executable game content is downloaded will be reduced before reducing the rate at which the streaming game video is communicated. The ratio of executable game content to streaming game video communication rates is thus reduced.

The rate at which executable game content is downloaded can be increased, as well as decreased, during the download process. For example, after a temporary reduction in communication channel bandwidth the rate can be incrementally increased to test whether a higher download rate is possible. If packets are lost then the download rate is again lowered a bit. Using this approach, optimum download rates can be found, even when the bandwidth of the communication channel varies with time. In some embodiments, the downloading of executable game content begins by starting at a relatively slow download rate and increasing the download rate until packets are lost. At this point the rate at which the executable game content is downloaded is reduced until packet loss reaches an acceptable level.

In some embodiments, Download Manager 165 is configured to receive an estimate of the available bandwidth between Video Server System 120 and Client 110B. This available bandwidth can be determined using testing discussed elsewhere herein and may include more than one communication channel. For example, an estimate of the available bandwidth can be received from Client Qualifier 160. Packets of the executable game content are optionally downloaded via a different communication channel than the streaming game video. These different communication channels may have some segments in common. For example, the executable game content may be downloaded from a Code Source 170 while the streaming game video is communicated from Video Source 130. Code Source 170 is optionally disposed at a location geographically remote from Video Source 130. Thus, the executable game content may pass through different segments of Network 115 relative to the streaming game video. Even if some segments are different, the executable game content and streaming game video may both pass through other segment(s) of Network 115, e.g., the final segment connecting Network 115 and Client 110B.

Depending on which segments of Network 115 limit the bandwidth of the communication channels through which the executable game content and streaming game video are communicated, it is sometimes possible to communicate and download more total bytes than would be possible through just one channel. For example, if a first communication channel through which the streaming game video is communicated is limited to a bandwidth of X Mbits/sec by a segment that is not used to download the executable game content, then the total amount of bytes of both the streaming game video and the executable game content that can be downloaded will be greater than X Mbits/sec. It is sometimes possible to increase the rate at which the executable game content is downloaded until either the bandwidth of a second communication channel used to download the executable game content is reached or the capacity of a segment of Network 115 shared by both the first and second communication channel is reached. The rate at which the executable game content is downloaded can be increased until either packets of the executable game content or packets of the streaming game video are dropped too frequently. This rate is then reduced to an optimum value at which no or an acceptable amount of packets are dropped. The determination of optimum communication and download rates can be managed using Download Manager 165 and/or Client Qualifier 160.

Code Source 170 includes a storage device such as a hard drive and/or solid state memory configured to store the executable game logic and optionally related content. Code Source 170 is optionally disposed in a location geographically distant from other parts of Video Server System 120. For example, a single instance of Code Source 170 in a first location can be shared by more than one Video Server System 120 located in more than one different location. In these embodiments, Code Source 170 is configured to provide multiple copies of executable game content (game logic and related content) to different members of Clients 110 in parallel, each copy sometimes being provided in parallel with streaming game video provided to the same members of Clients 110. Code Source 170 is optionally included in and/or managed by the same party as Game Server 125. Code Source 170 is optionally configured to provide executable game content for more than one video game title. The executable game content optionally includes add-ons and/or add-on data.

In some embodiments all or parts of Code Source 170 is distributed among some multiple devices, optionally including members of Clients 110. In these embodiments all or parts of the executable game content can be provided from one of Clients 110 to another of Clients 110 on a peer-to-peer basis. For this purpose, the testing and monitoring of communication channels described in relation to communication between Code Source 170 and Video Source 130 (as part of Video Server System 120) can also be applied to communication channels between members of Clients 110. For example, parts of the executable game content received by Client 110B can be received from Video Server System 120, Client 110A and/or a Client 110C (not shown). In some instances the relative proximity (e.g., network distance) of Client 110A and Client 110B may be much closer than the proximity of Client 110B and Video Server System 120. The peer-to-peer communication channels may, therefore, be preferred. The selection of which parts of the executable game content are received from which source is optionally made to optimize the delivery to Client 110B. When delivering from peer-to-peer the burden on each peer may be reduced by using more than 3, 5 or 10 more peers as sources. Download Manager 165 is optionally configured to manage the peer-to-peer communication. Video may also be generated and/or delivered on a peer-to-peer basis.

Download Manager 165 is optionally configured to manage the order in which the executable game content is downloaded. For example, the order in which the executable game content is downloaded can be changed in response to a state of the video game stored on Video Server System 120 or Client 110B. Download Manager 165 is optionally configured to monitor this state while the game is executed in either streaming and/or client side modes.

Download Manager 165 is further configured to manage downloading of a game state to Client 110B. This game state is the game state used by Video Source 130 to generate the streaming game video. The game state can be downloaded from an optional State Source 175 or from Game Server 125. In some embodiments, once an initial state is downloaded, Download Manager 165 is further configured to download updates such that two copies of the game state are maintained. For example, one copy of the game state can be stored at State Source 175 (and used by Video Source 130) while a second copy of the game state is maintained on Client 110B.

State Source 175 includes storage such as a hard drive and/or solid state memory configured to store a state of a video game. The stored state is optionally a subset of a global game state stored at Game Server 125, and is typically updated based on commands received from members of Clients 110 and/or state updates received from Game Server 125.

Download Manager 165 is optionally further configured to monitor the progress of the download of the executable game content and to initiate execution of the downloaded code on Client 110B using a Transition Logic 180. The initiation can occur when an executable subset of the executable game content is downloaded or when all of the executable game content is downloaded. Download Manager 165 is typically configured to detect when one or both of these conditions are met.

The initiation can be automatic or manual. Automatic initiation is performed by Transition Logic 180 and without requiring any action by a game player of Client 110B, while manual initiation requires some action by the game player. In automatic initiation commands are sent from Transition Logic 180A to Transition Logic 180C on Client 110B that cause the executable game content to install and/or start. Not all types of Client 110 necessarily allow remote automatic initiation of program execution for security reasons.

In manual initiation, a game player takes some action to start or permit the execution of the downloaded executable game content. For example, the game player may click on a button that allows execution of an installation program that installs the executable game content, sets configuration and data files, and/or starts execution of the game code once installed. This is a minimal interaction case in which the game player merely needs to make a single click. In other embodiments a game player must first initiate an installation of a game client from the downloaded executable game content, answer configuration questions during the installation, enter a license key, manually initiate execution of the installed game client, and/or the like. In various embodiments, any combination of these tasks may or may not be required of the game player.

In some embodiments, manual initiation of the execution of the downloaded executable game content is facilitated by controls presented to the game player through the same browser window as the streaming game video is displayed. For example, an initiation button can be presented to the game player as part of an overlay placed on the game video, or an initiation button can be displayed in another part of the same browser window as the streaming game video is shown. The streaming game video and the initiation control are optionally in different frames of the browser window.

In some embodiments, a game player is given control over when execution of the downloaded code is initiated. For example, a message may be displayed to a game player stating that game play must be transitioned from server side mode to client side mode within a predetermined time, e.g., 5 minutes. This message may be displayed as an overlay or may be displayed elsewhere in the browser window in which the streaming video is displayed, or may be displayed in a separate window. The message can include a button allowing the game player to initiate the transition at a time of their choosing, within the predetermined time. The message optionally counts down the predetermined time. At the end of this time the streaming game video is no longer provided to the client, although alternative content not including a real-time game play may be provided. In some embodiments, initiation of execution of the downloaded executable game content on Client 110B requires that a game player manually terminate receipt of the streaming game video, manually perform an installation of a game client based on the executable game content and then manually initiate execution of the game client. The game player is optionally given the predefined period of time in which to manually perform all or part of this transition.

In some embodiments permission to begin downloading is received from the game player and this permission is also used to initiate execution of both installation routines and the video game client. For example, a message can be presented to the game player requesting permission to download the executable game content and also execute the downloaded code when ready. This control can be presented through the control presentation approaches discussed elsewhere herein. The control can be presented once a game player requests the game, once the communication of streaming game video starts, or some time after the streaming game video is presented to the game player. For example, in various embodiments, downloading of executable game content only occurs after a predetermined time delay, after a specific game state is reached, after a player advances to a certain stage in the game, after a player saves a game state, and/or the like. A request for permission to begin downloading and/or to initiate execution of the executable game content is optionally accompanied by an option to purchase the game. For example, initiation of downloading and/or initiation of execution may require a payment.

In some embodiments, downloading of the executable game content does not begin until delivery of the streaming game video has been terminated by a game player. For example, Download Manager 165 may be configured to offer a game player to download the executable game content once the game player stops playing the game. Thus, in one embodiment, the game player may play the game in server side mode for 30 minutes (or some other time period) and then exit the game. Upon exiting the game the game player is offered an opportunity to purchase the game. If the game player accepts the executable game content is downloaded. The order of the download is optionally dependent on what the game player has done in the game while in the server side mode. For example, executable game content needed to support a current location of a game player's avatar may be downloaded first.

The game player may or may not decide to resume the game while this download is in progress. If the game player decides to resume the game then Download Manager 165 is configured to first determine if an executable subset (or all) of the executable game content has already been downloaded. If the executable subset or all of the executable game content has been downloaded then the downloaded game code is executed. If the executable subset or all of the executable game content has not been downloaded then the game is again executed in the streaming mode. Further executable game content may or may not be downloaded while the game is again played in server side mode. Periods of server side mode play can be interspersed with periods of downloading as the game player engages in multiple game sessions over time.

In some embodiments it may be found that what was thought to be an executable subset of the game code is not sufficient for a game player to play the game. For example, if the game player directs an avatar into a higher level region of the game before support for that region has been downloaded the client side mode of the game may be interrupted. Download Manager 165 is optionally configured to revert to server side mode execution of the game if this occurs. In this case the various transition steps described herein can be performed in reverse.

While the receipt of streaming game video does not typically initially require that the game player have an account registered before controlling an avatar, receiving the streaming game video, receiving the game code, saving a game state resulting from the game player's actions in the game and/or transitioning from server side mode to local execution mode typically do require an account. The account can be established automatically or by the game player. In some embodiments, Game Server 125 sometimes requires an account in order to play a multiplayer game. In these embodiments, an instance of Account Manager 185 within Video Server System 120, or elsewhere within Game System 100, may establish a temporary account meeting the requirements of Game Server 125. For example, Account Manager 185 may be configured to automatically generate a user name, password, geographic location, and/or the like. This account information is then used to establish a game session between Video Server System 120 and Game Server 125. This game session is used to communicate game commands and game state information between Video Server System 120 and Game Server 125. Because of Account Manager 185 a game player can start playing a server based video game before any account information is provided by the game player. Account information may be gathered from the game player over time, at a particular point in the game, when the player tries to save the status of a game, or when local execution of the game is initiated. For example, a game player may be asked to establish a user name and password after the game player has played for 5, 10 or 15 minutes, when a game player reaches a predetermined game level or game state, when a game player attempts to save a game state, and/or the like. The game player may also be asked to pay for the game when establishing account information. A request to establish an account is optionally presented as an overlay on the streaming video or optionally elsewhere on the same browser window as the streaming game video is presented.

In some embodiments, when switching between server side rendering of game video (server side mode) and client side rendering of game video (client side mode) of the game, Transition Logic 180A is configured to provide account information received by Video Server System 120 from Client 110B to Game Server 125. Transition Logic 180B uses this account information to replace account information that was automatically generated by Account Manager 185. For example, when a game player first initiates a streaming video game, Account Manager 185 may provide Game Server 125 with a randomly generated user name (SLE4IF45FFK1) and password (kalL128Iup). Prior to transition between server and client execution modes, a user name (EmmaP) and password (4mybutterfly) selected by the game player is received by Video Server System 120. Around the time of transition the game player selected account information is sent from Transition Logic 180A to Transition Logic 180B and these values are used by Transition Logic 180B to replace the automatically generated account data in the memory of Game Server 125. Thus, game player selected account information replaces the temporary account information automatically generated by Video Server System 120.

In some embodiments, the account information automatically generated by Video Server System 120 further includes a server selection, player referral information, a geographical location, and/or the like. Player referral information is information regarding how a player was introduced to a game. A player may be introduced by a website, an advertisement a marketing program, another game player, etc. In these cases the referral information typically includes an identity of the referrer. For example, a link configured to allow a first game player to play a streaming video game may be displayed on a page of a second game player on a social networking web site. An identifier of the second player (or avatar thereof) can be included within the link and Video Server System 120 is configured to use this identifier to identify the second player. The identity of the second player can be used by Account Manager 185 or Game Server 125 to give the second player credit for referring the first player. Further, the identity of the second player can be used by Game Server 125 to place the first player on a same game server, avatar faction, location in a game environment, etc. as the second player. These are further examples of account information that is optionally generated by Video Server System 120.

In a more specific example, a copy of the streaming game video or a frame thereof, from the game World of Warcraft®, is provided by Video Source 130 to the first player at Client 110B is provided to the FaceBook® page of the first player. This copy of the streaming game video is associated on the page with a link configured to allow the second player to join the first player in playing World of Warcraft. When the link is clicked by the second player an identifier is sent to an instance of Video Server System 120. Account Manager 185 uses this identifier to look up the World of Warcraft server, player faction (Horde or Alliance), and optionally location within the World of Warcraft game space, of the first player. Account Manager 185 uses this information to automatically generate (or suggest) account information for the second player that places the second player on the same World of Warcraft server and player faction as the first player. Account Manager 185 may also provided information to Game Server 125 identifying the first player as having referred the second player. Thus, the first player can get credit for bringing the second player into the game.

Some of the account information communicated from Video Server System 120 to Game Server 125 by Account Manager 185 is generated during game play. For example, during game play a game player may associate add-ons with an account or establish avatars. This information can be communicated to where it is needed for client side execution mode as it is generated, when the game is next saved, as part of a periodic communication event, and/or the like.

Transition Logic 180 is optionally configured to communicate other information between elements of Game System 100. For example, installed add-on code and generated add-on data may be transferred to Client 110B from Video Server System 120 or elsewhere in Game System 100. This transfer may occur at the time of transition or prior to transition. In some embodiments, generated add-on data and/or add-on code is copied to Client 110B in parallel with the communication of streaming game video from Video Source 130 to Client 110B.

A game player's account information optionally includes an IP (Internet Protocol) address to which Game Server 125 provides game state information. This IP address may be different for different login sessions. For example, each time a game player logs into play the video game provided by Game Server 125 Video Source 130 may be provided a different IP address. Likewise Client 110B may have a different IP address for each session in which it receives streaming game video from Video Source 130. In the prior art, the IP address to which Game Server 125 sends game state information does not change within an individual game session. If the IP address changes the game player must login again, or start from some initial state to start a new game session. In this way the IP address is associated with a game player authenticated by the login. Likewise, when game commands are received by Game Server 125, the IP address from which the commands are sent is used to assign the commands to a specific game session/game player.

In some embodiments of the invention, the IP address to which Game Server 125 sends game state information, and from which game commands are received, are changed within a single game session. For example, when the transition between streaming game mode and local game mode is performed Game Server 125 switches from sending game state information to and receiving game commands from Video Source 130 to sending the game state information and receiving the game commands from Client 110B. This is optionally accomplished without requiring that the game player login again.

To change the IP address Transition Logic 180A sends the client IP address that Video Source 130 uses to communicate with Client 110B, to Game Server 125. The client IP address is accompanied by a request that Game Server 125 send game state information to Client 110B and/or to accept game commands from Client 110B. At Game Server 125 Transition Logic 180B receives this client IP address and associates it with a particular game session. Future game states are then sent to this client IP address in addition to or instead of the IP address of Video Source 130. Likewise, if game commands are received at Game Server 125 from the client IP address they are associated with the game session of the game player. This association is made even when the game session, and optional login, were initially established via Video Source 130. Further, the game server IP address used by Video Source 130 to communicate with Game Server 125 is optionally provided to Client 110B so that Client 110B can send game commands directly to this game server IP address. Providing this game server IP address to Client 110B is optional in embodiments wherein the IP address of Game Server 125 is included within the executable game content downloaded to Client 110B.

In some embodiments, by associating the client IP address with the game session, the game session is associated with more than one client. In this case the subset of the game state may be sent to both clients. For example, the subset of the game state can be sent from Game Server 125 to both Client 110B and Video Source 130. (Game Server 125 views Video Source 130 as a client, and may or may not differentiate Video Source 130 and Client 110B as different types of clients.) After some time, the association between the game session and the IP address of Video Source 130 may be dropped. In some embodiments, associating the client IP address with the game session automatically results in dissociating the IP address of Video Source 130 with the game session. Whether or not the dissociation occurs immediately or two IP address are associated with the game session for some time, the end result is that Transition Logic 180 causes the game session to be reassigned from a first client to a second client. This reassignment optionally occurs during a single game session, without starting a new game session.

Download Manager 165 and/or Transition Logic 180 are optionally configured to maintain two copies of the subset of the game state used by Video Source 130 to render streaming game video. One of these copies is located at Video Source 130 and the other at Client 110B. These copies are maintained by sending state updates to Client 110B from either Video Source 130 or Game Server 125. The two copies of the state allow the execution mode transition to take place without inconsistency in the state experienced by the game player. Specifically, the same state is available to both the game logic executing on Video Source 130 and game logic executing on Client 110B. The two copies of the state are maintained for a period of time prior to, during and/or after the transition. This period of time can be short. In some embodiments, the game logic on Video Source 130 and the game logic on Client 110B are executed in parallel for a time such that two copies of video frames configured for presentation to the game player are generated in different places. Execution of the downloaded executable game content one Client 110B is optionally initiated while the streaming game video is still being communicated to and/or displayed on Client 110B.

In some embodiments Transition Logic 180 and/or the downloaded executable game content is configured to terminate presentation of the streaming game video received by Client 110B from Video Source 130 upon execution of the downloaded executable game content. For example, the executable game content may, when executed, close a browser window in which the streaming game video is being presented. Alternatively, the executable game content may be configured to redirect the browser window from Video Source 130 to a video output of the executable game content. For example, Transition Logic 180C may provide a URL of a local output of the executed game code to the browser window such that the video stream received from Video Source 130 is replaced by the video output of the downloaded executable game content. The next time the executable game content is executed it is optionally configured to present game video in its own program window rather than a browser.

As discussed elsewhere herein, in some embodiments Download Manager 165 and/or Transition Logic 180 are configured to begin execution of the downloaded executable game content after only a subset of this game code is downloaded. Typically Download Manager 165 is configured to increase the rate at which the executable game content is downloaded after transition because the download rate need no longer be limited in order to assure a minimal quality of the streaming game video.

Processor 150 is configured to execute logic, e.g. software, included within the various components of Video Server System 120 discussed herein. For example, Processor 150 may be programmed with software instructions in order to perform the functions of Video Source 130, Game Server 125, Client Qualifier 160, Download Manager 165, Code Source 170, State Source 175, and/or Transition Logic 180A. Video Server System 120 optionally includes more than one instance of Processor 150. Processor 150 may also be programmed with software instructions in order to execute commands received by Video Server System 120, or to coordinate the operation of the various elements of Game System 100 discussed herein. Processor 150 may include one or more hardware devices. Processor 150 is an electronic processor.

Storage 155 includes non-transitory analog and/or digital storage devices. For example, Storage 155 may include an analog storage device configured to store video frames. Storage 155 may include a computer readable digital storage, e.g. a hard drive, an optical drive, or solid state storage. Storage 155 is configured (e.g. by way of an appropriate data structure or file system) to store video frames, artificial frames, a video stream including both video frames and artificial frames, audio frame, an audio stream, add-ons, add-on data, executable game content, and/or the like. Storage 155 is optionally distributed among a plurality of devices. In some embodiments, Storage 155 is configured to store the software components of Video Source 130 discussed elsewhere herein. These components may be stored in a format ready to be provisioned when needed.

Figure 2:
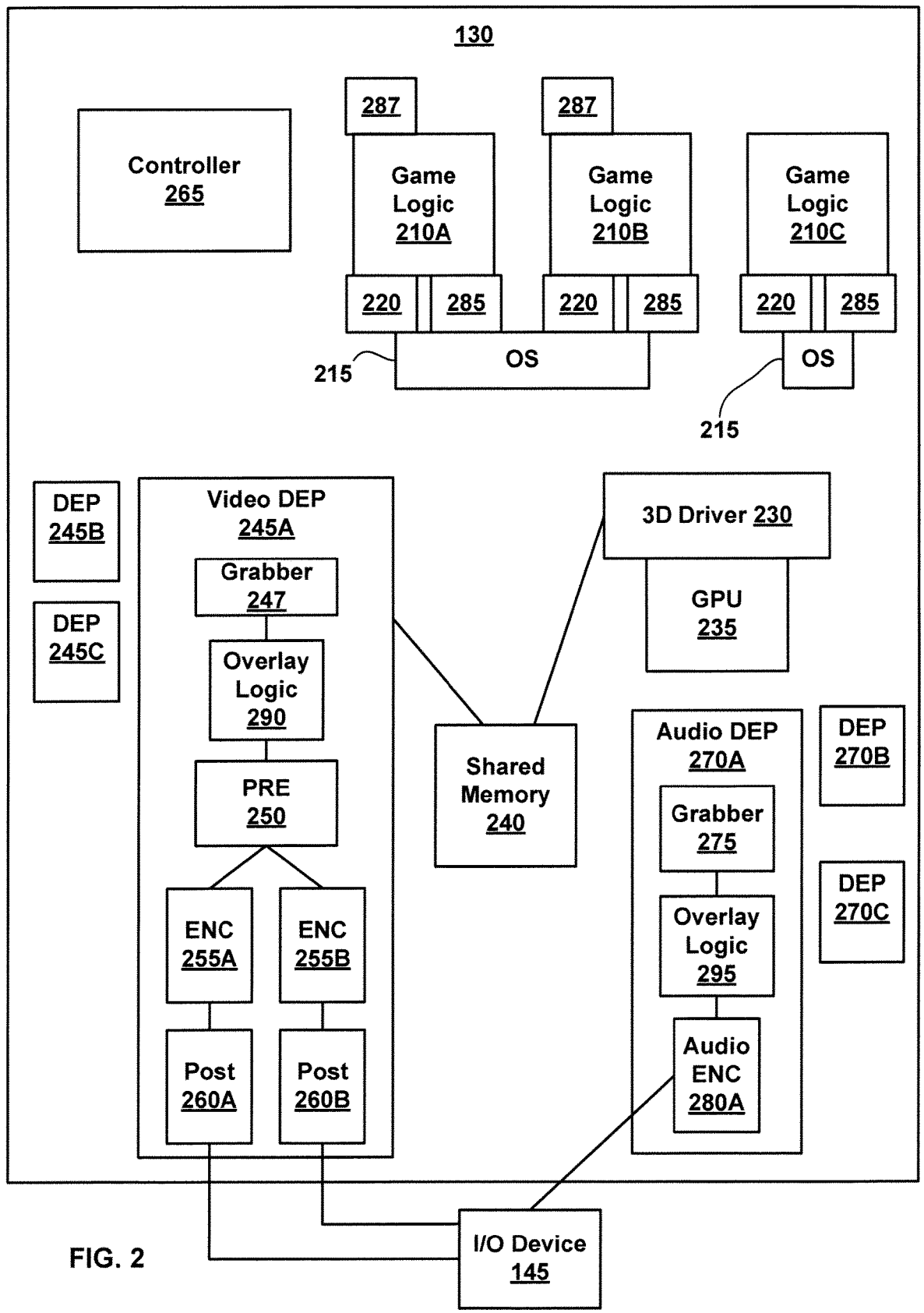
FIG. 2 is further details of a video source configured to serve multiple video games, according to various embodiments of the invention.

FIG. 2 illustrates further details of Video Source 130 configured to serve multiple video games, according to various embodiments of the invention. The multiple video games can include multiple instances of the same video game and/or instances of different video games. The video games are optionally multiplayer games. For example, a game state of one or more of the video games may be maintained by one or more instances of Game Server 125 each based on inputs received from multiple clients. The elements of Video Source 130 illustrated in FIG. 2 are optionally executed using Processor 150.

The video games are executed using different instances of Game Logic 210, individually labeled 210A, 210B, 210C, etc. Game Logic 210 is configured to use a game state to determine a game environment that can be rendered to a video stream configured to be presented to a game player. The game environment is a two or three dimensional virtual environment including in-game objects, avatars, locations of objects, their shapes, textures, and spatial relationships there between, and the like. A game environment can include vertex data, transformation data and texture data, and/or the like.

Game Logic 210 is configured to provide a video game as part of a "game session." A game session is optionally a time period between a game player logging on to play a video game and logging off, or being otherwise disconnected from the game. In embodiments where a game player plays a game without an established account to login to, a game session is a continuous time period during which a game player's progress and/or state is trackable and maintained by the game program. If the player is not associated with an account to which game progress and/or state is saved, then the game progress and state are lost when the game session terminates. Game sessions may exist between Client 110B and Video Source 130, between Client 110B and Game Server 125, and between Video Source 130 and Game Server 125. In some embodiments, a game session is transferred from being between Game Server 125, and Video Source 130 to being between Client 110B and Game Server 125, (and/or vice versa) without termination of the game session.

The rendering of the game environment is typically based on one or more points of view associated with a specific game player. These points of view can be drastically different, such as an overhead view and a forward view. Or, the points of view can be from positions differing by approximately the distance between a person's pupils, and configured to create a 3D image. Video Source 130 may include more than 1, 2, 3, 5, 7, 15, or 31 instances of Game Logic 210. Game Logic 210 is optionally a client of Game Server 125 and may be configured to communicate with Game Server 125 via Network 115.

Game Logic 210 is configured to receive game commands from one or more of Clients 110 and to process the received commands according to a set of game rules. These rules cover, for example, how avatars interact with other avatars or in game objects, avatar movement, game instance management, and/or the like. Game Logic 210 is optionally also configured to generate audio data based on events within the game. This audio data may represent a gunshot, a splash, an engine, voice, flying, rain, music, or any other sound that could occur in a game. For example, an event such as one object hitting another may result in audio data representing a related sound. Game Logic 210 includes hardware, firmware, and/or software stored on a computer readable medium. Game Logic 210 is typically associated with related game content.

Each instance of Game Logic 210 can be disposed on a separate computing device or several instances of Game Logic 210 could be disposed on the same computing device or a single instance of Game Logic 210 could be disposed across multiple computing devices. Instances of Game Logic 210 can dynamically change the number and/or identify of computing devices used depending on the requirements of the game environment the game player is currently experiencing. Instances of Game Logic 210 disposed on the same computing device are optionally executed within separate virtual machines or virtual I/O shells. In some embodiments, different instances of Game Logic 210 are configured to communicate game commands and/or game state information directly to each other, e.g., without necessarily communication through Game Server 125.

Game Logic 210 typically executes on top of an Operating System (OS) 215. Operating System 215 may include Windows™, Linux, UNIX, Mac OS™, Solaris™, and/or the like. A virtual machine platform may operate between Operating System 215 and Game Logics 210. The virtual machine platform can include commercial systems such as ESX, Hyper-V, and/or the like. In these embodiments, one or more of Game Logic 210 can be executed within a virtual machine. Multiple instances of Game Logic 210 may execute on the same instance of Operating System 215. For example, FIG. 2 illustrates Game Logic 210A and Game Logic 210B both executing on the same Operating System 215. Instances of Game Logic 210 executing on the same Operation System 215 may, or may not, be configured for playing the same video game. For example, Game Logic 210A, 210B and 210C may all be World of Warcraft® clients, or may be clients of World of Warcraft®, Eve® and Call to Arms® respectively.

In some embodiments, the game environments determined by Game Logic 210 are passed to an optional Virtual 3D Video Driver 220. Virtual 3D Video Driver 220 is configured to appear, from the point of view of Game Logic 210, as a non-virtual 3D video driver controlling a graphics processing unit. Each instance of Game Logic 210 may be associated with its own instance of Virtual 3D Video Driver 220, or Virtual 3D Video Driver 220 may be shared by two or more instances of Game Logic 210. In some embodiments, game audio determined by each Game Logic 210 is passed to an optional Virtual Audio Driver 285. Game audio includes sound data configured to be presented to a game player as part of an audio stream. The game audio can result from rules of the game, e.g., shooting a gun should result in a popping sound, or may be received from other sources such as music tracks, members of Clients 110, a microphone, and/or the like.

In alternative embodiments, Game Logic 210 is configured to include the functionality, as discussed herein, of Virtual 3D Video Driver 220 and/or Virtual Audio Driver 285. In these embodiments, Virtual 3D Video Driver 220 and/or Virtual Audio Driver 285 are not required.

Virtual 3D Video Driver 220 is further configured to pass the received game environments to a (non-virtual) 3D Driver 230. Optionally the delivery of game environments to 3D Driver 230 is coordinated by the various instances of Virtual 3D Video Driver 220. For example, delivery can be coordinated such that 3D Driver 230 receives game environments from only one or a minimum number of Virtual 3D Video Driver 220 at a time. In typical embodiments, each of Virtual 3D Video Driver 220 is configured such that they appear to be a separate process and a separate source of video data to 3D Driver 230. As such, 3D Driver 230 is configured to keep track of which video data results in which video frames after rendering.

The video data received by 3D Driver 230 are passed to Graphics Processing Unit (GPU) 235 for rendering into raw video frames. Graphics Processing Unit 235 is optionally used to render more than one video stream in parallel. For example, Graphics Processing Unit 235 may generate a first video stream based on video data received from Game Logic 210A, generate a second video stream based on video data received from Game Logic 210B, generate a third video stream based on video data received from Game Logic 210C, etc. in parallel. The parallel production of video streams includes the generation of these streams at the same time. However, parallel production of video streams may, but does not necessarily, include the processing of individual frames at the same time within Graphics Processing Unit 235. For example, in some embodiments 3D Driver 230 alternatively passes the video data generated by the various members Game Logic 210 to Graphics Processing Unit 235. Data generated by Game Logic 210A is used to make a video frame, and subsequently data generated by Game Logic 210B is used to make a video frame, etc. In this case, the video streams are produced in parallel while individual frames are produced in series. Alternatively, more than one video frame may be generated within Graphics Processing Unit 235 at the same time. In this case a first part of Graphics Processing Unit 235 is used to generate one frame while a second part of Graphics Processing Unit 235 is used to generate a second frame, the first and second frames arising from video data produced by different Game Logic 210. In some embodiments, one set of graphical computation cores is used to generate the first frame while a second set of graphical computation cores is used to generate the second frame, at the same time. The resulting video frames are passed back to the control of 3D Driver 230.

Virtual 3D Video Drivers 220 are optionally configured to manage the transfer of raw rendered video frames from 3D Driver 230. For example, Virtual 3D Drivers 220 may be used to coordinate the transfer of video frames from the control of 3D Driver 230 to a Shared Memory 240. (Following rendering, the video frames are in a memory of Graphics Processing Unit 235 or a memory managed by 3D Driver 230. In either case they are under the control of 3D Driver 230.) As Virtual 3D Video Drivers 220 manages the communication of video data and frames to and from 3D Driver 230, in some embodiments, they are capable of placing the video frames within parts of Shared Memory 240 associated with specific Video Dynamic Encoding Pipelines (DEPs) 245. The Video DEPs 245 are individually identified as Video DEP 245A, Video DEP 245B, Video DEP 245C, etc. In these embodiments, each Video DEP 245 is assigned specific memory locations within Shared Memory 240, and is configured to retrieve video data from those locations.

In other embodiments, Virtual 3D Drivers 220 are configured to manage the transfer of video data to Shared Memory 240 based on timing. In these embodiments, the transfers managed by each of Virtual 3D Drivers 220 are synchronized and the Virtual 3D Drivers 220 notify each Video DEP 245 when data for them is in Shared Memory 240. Once this data is retrieved by the notified member of Video DEPs 245, data for another member of DEPs is transferred from 3D Driver 230 to Shared Memory 240 under the control of Virtual 3D Video Drivers 220. In these cases pixels read back from the local GPU memory to Shared Memory 240 can be based on a schedule. As used herein the terms "in sync" and "synchronized" are meant to mean that the two events are related in time by a schedule, by a timing signal, by a time delay, or that one event does not start until the other event has satisfied a condition, e.g., has completed. For example, Virtual 3D Drivers 220 may operate in sync such that a game environment is provided to 3D Driver 230 from a first of Virtual 3D Drivers 220 once Graphics Processing Unit 235 has completed rendering of a game environment from a second of Virtual 3D Drivers 220. The timing of this synchronization is optionally selected to make optimum use of Graphics Processing Unit 235.

As a result of the management by Virtual 3D Video Drivers 220, the multiple video streams can be stored in Shared Memory 240 without confusing which frames belong to which video stream. Shared Memory 240 is optionally configured to store audio as well as video data. This audio data may be stored and/or managed in ways similar to that discussed with respect to video data.

Virtual Audio Drivers 285, are optionally part of a virtual I/O shell between Game Logic 210 and OS 215. They are configured to appear from the point of view of Game Logic 210 as an audio driver and to pass any audio data they receive from Game Logic 210 to one of Audio DEP 270. For example, in some embodiments, the Virtual Audio Driver 285 associated with Game Logic 210A is configured to send audio data to Audio DEP 270A, and the Virtual Audio Driver 285 associated with Game Logic 210B is configured to send audio data to Audio DEP 270B, etc.

Shared Memory 240 includes random access memory (RAM) or a similar memory configured for efficient reading and writing of video data. Shared Memory 240 is configured to store video data for a plurality of different Video DEP 245. Video data for different Video DEPs 245 is optionally stored at the same time in Shared Memory 240. Shared Memory 240 may consist of a single hardware device or may include multiple devices.

Video DEPs 245 are dynamically allocated encoding pipelines that are each configured to encode video data rendered using Graphics Processing Unit 235. Each member of Video DEPs 245 is configured to encode to video formats specified at the time the Video DEP 245 is provisioned. This format specification is typically based on the needs of one of Clients 110 and/or the capabilities of the communication path between Video Server System 120 and the Client 110.

Video DEPs 245 are optionally provisioned dynamically in response to a request from one of Clients 110. For example, when Client 110B connects to Video Server System 120 and sends a request for a video stream, Video DEP 245 can be provisioned to include elements, such as an encoder, selected specifically to meet needs of Client 110B. As is discussed elsewhere herein, a member of Video DEPs 245 is optionally configured to use more than one encoding scheme.

Video DEPs 245 each include a Grabber 247 configured to grab video data from Shared Memory 240 and transfer this video data to a memory of the Video DEP 245. The Grabber 247 is optionally under the control of a member of Virtual 3D Video Drivers 220. For example, in various embodiments, Grabber 247 is controlled by a member of Virtual 3D Drivers 220 to grab the video data from a specific location within Shared Memory 240 and/or at a specific time in synchronization with the transfer of video data to other members of Video DEPs 245.

Video DEP 245 each optionally includes an Overlay Logic 290 configured to overlay one or more video images on the video data, e.g., frames, generated by Graphics Processing Unit 235. An overlay is a first image to be placed on a second image, or a sound added to another sound. Overlays may be applied with varying levels of transparency. For example, the first image can be opaque and, thus, completely hide covered parts of the second image, or the first image can be partially transparent in which case the second image can still be somewhat visible under the first image. An overlay may cover all or part(s) of the underlying image. For example, an overlay may be configured to cover certain pixels within a larger area. In this case the overlay is mapped to pixels on a display of one of Clients 110 or mapped to pixels within an image generated by Graphic Processing Unit 235. The mapping can be accomplished in various ways. For example, a lower left pixel of the overlay may be assigned to a specific pixel on a video frame generated by Graphics Processing Unit 235. In some embodiments, Overlay Logic 290 is configured to resize an overlay prior to applying the overlay. Overlay Logic 290 is optionally located in other positions within Video DEP 245A. For example, after Preprocessor 250.

The overlays can include a wide variety of pixel/video images. For example, an overlay can include a real-time or static image of a game player received via the internet, a real-time or static image of a sporting (or other) event, an image of a input control (e.g., "a," "b," "TAB," "Return," "Space Bar," "Function Key," "Arrow," and/or other keys or input devices), a map, text, and/or the like. Overlays can vary widely in size and shape. In some cases the overlay is the result of rendering a 3D game environment. More than one overlay can be placed on an image. These overlays can be overlapping or separate. Overlays are optionally received in an encoded format and decoded prior to being applied.

The presence and content of overlays are optionally responsive to received game commands, identity of one or more game players, an account type, identity of a game being played, video captured from a prior or real-time sporting event or real-world game, game rules, and/or the content of video generated by Game Logic 210. For example, an overlay may include a menu resulting from receipt of a game command. An overlay may include content responsive to a pixel pattern, e.g., image, included within video generated by Game Logic 210. Overlay Logic 290 is optionally configured to apply multiple overlays to a single video frame and these overlays may be from different sources.

Overlay Logic 290 is optionally configured to apply an overlay after a video frame has been preprocessed using Preprocessor 250 and/or after encoding using one of Encoders 255. In some embodiments the overlay includes an image received at an input of Video Source 130 (e.g., I/O device 145) via the internet and Overlay Logic 290 includes video processing logic configured to generate the overlay from the image. The received image is optionally received from an image source such as a camera or a file storage.

Video DEPs 245 each optionally also include a Preprocessor (PRE) 250. Preprocessor 250 is configured to perform a color space conversion such as RGB to YUV and/or a scaling operation to increase or decrease the resolution of the video frame. Preprocessor 250 is optional in embodiments wherein the output of Graphics Processing Unit 235 is in the YUV color space or some other desired color space. Multiple Preprocessor 250 may be included in a Video DEP 245 configured to produce multiple video streams having video frames of different sizes.

Video DEPs 245 each include at least one Encoder (ENC) 255. Encoders 255 are individually identified as Encoder 255A, Encoder 255B, etc. Each of Encoders 225 is configured to encode the video data according to a specific codec, and optionally a specific color depth and/or frame size. For example, Encoders 225 may be configured to encode video data to Adobe Flash® standard, .flv, .wav, .avi, .mpg, H.264, H.263, On2, VP6, VC-1, WMA, and/or other codecs discussed herein.

A member of Video DEPs 245 may include one, two or more Encoders 255. These encoders may be configured to encode to different codecs and/or the different formats of the same codec. For example. Encoder 255A may be configured to encode according to a Flash standard at a first frame size and color depth while Encoder 255 is configured to encode to the same Flash standard at a second frame size and color depth. The identity of Encoders 255 within each member of Video DEPs 245 is typically determined at the time the Video DEP 245 is provisioned. For example, a single command or command set may be used to create (provision) Video DEP 245A and specify which components the created Video DEP 245A should include. The creation of Video DEP 245A is discussed further elsewhere herein. A member of Video DEPs 245 including two or more Encoders 255 is alternatively viewed as two or more separate Video DEPs 245 having some but not all components in common. For example, Video DEP 245A and Video DEP 245B may have the same Preprocessor 250 but different Encoders 255.

In one example, Encoder 255A is configured to use a codec for H.264 while Encoder 255B is configured to use a codec for H.263. Having two or more different encoders available enables Video DEP 245A to change encoding during delivery of a video stream. The change in encoding can be from one type of encoding to another, or merely a change in characteristics of a specific type of coding. For example, the characteristics may change in terms of color depth, number of frames per second, encoding options, number of pixels, and/or the like. In some embodiments, Video DEP 245A is optionally configured to switch between Encoder 255A and 255B in response to a change in the characteristics of Client 110B or the communication channel between Client 110B and Video Source 130.

In practice, when a different codec other than that being used is required a new Video DEP 245 is spawned and executed in parallel with the current Video DEP 245 for a short period of time. The new Video DEP 245 is optionally a branch of the original Video DEP 245. For example, some components of the original Video DEP 245 may be used in the new Video DEP 245. These two Video DEP 245 may have components logically arranged in a tree structure.

In some embodiments, Video DEP 245 are configured to use two or more different encoders to generate two or more different video streams at the same time. These video streams are based on the same game environment rendered by Graphics Processing Unit 255 and, thus, include essentially the same materials (with the possible exception of overlays) and can be sent to different places. For example, one of the video streams can be sent to Client 110A while the other is sent to Client 110B. Alternatively, one of the video streams can be sent to Client 110B and the other to a website where third parties can watch the video. This website is optionally part of a social networking site or a game player's site. The two different video streams may be different in the frame rate, encoding type, frame size, color depth, etc. For example a video stream delivered to a social networking website can be of much lower quality than the video stream delivered to a game player who is playing a game using Client 110B. The second video stream may be directed to a game player who is playing the game or to people who are merely observing the game play. A video stream is optionally directed to more than one place.

Video DEP 245A optionally includes one or more Post Processors (Post) 260. Individual examples of Post Processors 260 are labeled 260A and 260B. Post Processors 260 are configured to package an encoded video frame in a container in a format appropriate for communication over a network according to a public or proprietary network protocol. For example, some protocols such as Adobe RTMP require post processing while other video standards such as H.264 Annex B do not require post processing. Each of Post Processors 260 may be associated with a specific member of Encoders 255, or several Post Processors 260 may be configured to receive encoded video frames from one member of Encoders 255.

The output of Post Processors 260 is directed to I/O Device 145 for delivery to one or more of Clients 110. The Elements of Video DEPs 245 discussed herein include hardware, firmware and/or software stored on a computer readable medium. For example, each of Video DEPs 245 may represent a set of software loaded into memory and executing using an electronic processor.

Audio DEPs 270 are configured to receive audio data generated by members of Game Logic 210 and encode this audio data to audio packets. The encoded data packets are then sent to Clients 110 using I/O Device 145 and Network 115. Audio DEPs 270 are also optionally configured to place an audio overlay on the audio data received from Game Logic 210. Different Audio DEPs 270 are individually labeled 270A, 270B, 270C, etc.

As with Video DEPs 245, Audio DEPs 270 are typically allocated as needed and assigned to process audio data from a specific member of Game Logic 210. This audio data may be based on events within a video game. For example, actions taken by one or more players of the video game may result in audio data according to game rules (e.g., falling in water makes a splashing sound). Allocation of Audio DEP 270A is typically responsive to the same factors and performed in the same manner as allocation of Video DEP 245A. For example, the elements included in Audio DEP 270A may be responsive to needs of one of Clients 110. Audio DEP 270 may receive audio data from Shared Memory 240 and/or directly from one of Virtual Audio Drivers 285.

Audio DEP 270A optionally includes a Grabber 275 configured to receive audio data from one of Virtual Audio Drivers 285, to receive audio data from one or more sources external to Video Server System 120, and/or to get audio data from Shared Memory 240. For example, in some embodiments Grabber 275 is configured to retrieve data received from sources external to Video Source 130, such as one or more of Clients 110, over the internet. The audio received, from any of these sources, can include voice audio, music, sound effects, sound tracks, alerts, and/or the like. For example, the voice of a game player using Client 110A may be received from Client 110A, or the game player may provide music to be heard by a game player using another of Clients 110. Audio data may be received, as audio streams, from more than one game player in parallel.

Audio DEP 270A optionally further includes Overlay Logic 295. Overlay Logic 295 is configured to place one or more audio overlays on audio data generated by a member of Game Logic 210. The audio overlays can include audio, music, sound effects, sound tracks, alerts, and/or the like. For example, in some embodiments, an audio overlay includes voice data received as data packets from one or more game players over the internet. These data packets are optionally decoded by Overlay Logic 295 prior to being included in the overlay. Placement of overlays on the audio data generated by a member of Game Logic 210 optionally includes addition of this data to the generated audio data. All or part of an audio overlay can be received from a source external to Video Source 130. For example, in some embodiments the overlay includes audio data received at I/O Device 145 via the internet and Overlay Logic 290 includes audio processing logic configured to generate an audio overlay from this audio data. When referring to audio overlays, the identities of which data is the overlay and which is the data on which the overlay is being applied may be arbitrary as, in some embodiments, audio data does not have a sense of layering order that can be possible in video data.

Audio DEP 270A further includes an Audio Encoder 280A. Audio Encoder 280A is configured to encode the audio data generated by a member of Game Logic 210 and the audio overlay into an audio packet according to an audio codec. The encoding is typically performed after the audio overlay(s) have been applied to the audio data.

Grabber 275, Audio Encoder 280A and Overlay Logic 295 include hardware, firmware, and/or software stored on a computer readable medium. Audio DEP 270B and Audio DEP 270C are alternative embodiments of Audio DEP 270A.

The operation of Video Source 130 is typically managed by a Controller 265. Controller 265 includes hardware, firmware and/or software stored on a computer readable medium. For example Controller 265 may include software stored in memory and executed using a microprocessor.

In some embodiments, Controller 265 is configured to provision instances of Game Logic 210A, Virtual Audio Driver 285 and Virtual 3D Video Driver 220 in response to a request to play a game. For example, if a request for a specific video game is received from Client 110B, Controller 265 may retrieve Game Logic 210A, Virtual Audio Driver 285 and Virtual 3D Video Driver 220 from Storage 155 and place these in working memory. Game Logic 210A may be placed in communication with both Client 110B and Game Server 125. Game Logic 210A is then executed using Processor 150 in order to play the video game.

In some embodiments, Controller 265 is configured to allocate instances of Video DEP 245 and/or Virtual Audio Driver 285 in response to a request to play a game. For example, Controller 265 may be configured to first determine or receive the requirements for Video DEP 245A and Audio DEP 270A and then provision computing instructions that satisfy those requirements. Video DEP 245A and Audio DEP 270 are then associated with one of Game Logic 210 and one of Virtual 3D Driver 220. The provisioned Video DEP 245A is optionally configured to retrieve raw video data from a specific area within Shared Memory 240.

In some embodiments the requirements for Video DEP 245A and/or Audio DEP 270A are determined by querying a game player using Client 110B. For example, Controller 265 may be configured to cause text messages to appear on Client 110B, the messages requesting that a game player using Client 110B enter characteristics of a video stream desired by a game player. These characteristics can include a connection type, a frame size, an encoding scheme, a frame rate, a color depth, and/or the like. The entered characteristics are conveyed back to Controller 265, which then used these characteristics to select elements to include in Video DEP 245A and/or Audio DEP 270A when they are provisioned. For example, if the game player requests a specific encoding scheme, then an Encoder 255 configured to use the requested encoding scheme is selected and included in Video DEP 245A.

In some embodiments the requirements for Video DEP 245A and/or Audio DEP 270A are determined automatically. For example, information gathered using a client qualifier can be used to determine the requirements for Video DEP 245A. In this example, if Client 110B includes only a Microsoft Silverlight® decoder and an Adobe Flash® decoder, then at least one of the corresponding encoder configurations or variants thereof is required in Video DEP 245A. Characteristics of the video stream to be generated using Video DEP 245A, such as frame size, color depth and frame rate, can also be determined by Controller 265 in this way.

The determination of requirements for Video DEP 245A and/or Audio DEP 270 may include both the use of characteristics provided by a game player and characteristics automatically determined. In some embodiments, the possible characteristics are limited by a game player's account type, payment and/or subscription. For example, a game player may pay to receive a higher quality video stream.

Controller 265 may also manage sharing of Shared Memory 240. For example, Controller 265 may configure Video DEP 245A and/or Audio DEP 270A to use specific memory locations within Shared Memory 240 and/or Controller 265 may be configured to configured Video DEP 245A and/or Audio DEP 270A to access Shared Memory 240 in response to certain timing signals. The timing signals being timed for synchronization of access to Shared Memory 240 by different Video DEPs 245.

Figure 3:
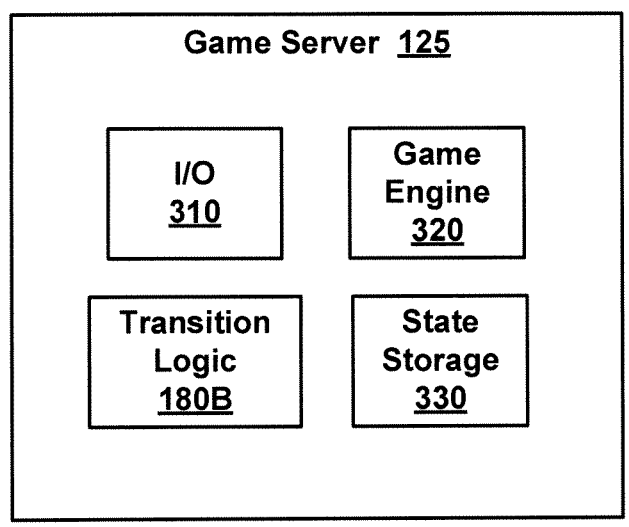
FIG. 3 illustrates further details of a game server, according to various embodiments of the invention.

FIG. 3 illustrates further details of Game Server 125, according to various embodiments of the invention. Game Server 125 is configured to maintain a global state of a video game based on game commands received from a plurality of clients. These clients may be Clients 110, Video Source 130, and/or other types of clients. Game Server 125 can include one or more computing devices. For example, in some embodiments Game Server 125 includes different hardware devices dedicated to supporting different regions, instances or dungeons within a game.

Game Server 125 includes an Input/Output (I/O) 310 configured to receive game commands from a plurality of geographically remote clients via Network 115. Input/Output 310 typically includes network connections such as Ethernet ports, routers, gateways, and/or the like. These network connections are optionally configured to communicate using TCP, UDP and/or other standards. Input/Output 310 is also configured to send game state information to the plurality of clients. This game state information typically includes subsets of a global game state maintained by Game Server 125. The subset provided to each client is normally dependent on a location of an avatar and a particular game session associated with the client. For example, a subset of the global game state typically includes the state of the game representative of the area around the avatar. The subset is configured to be sufficient to define the game environment around the avatar and, thus, enable the rendering of streaming video based on a point of view of the avatar. The global game state is representative of an entire game or a significant part of a game and is based on game rules and game commands received from the geographically remote clients.

Game Server 125 further includes a Game Engine 320 configured to maintain the global state of a video game based on the received game commands and a set of game rules. Game Engine 320 also keeps track of individual game sessions and is configured to select and generate a subset of the global game state for each game session. These subsets are provided to different members of the plurality of clients. Typically each generated subset of the global game state is assigned to a particular member of the plurality of clients respectively. This assignment is based on a game session established between Game Engine 320 and the particular client.

Game Server 125 optionally further includes Transition Logic 180B configured to transition game play from the server side mode to the client side mode, and optionally vice versa. Specifically, Transition Logic 180B is configured to transition, within a single game session, communications with Game Server 125 from a first client to a second client. Typically, the first client will be an instance of Video Source 130 and the second client will be one of Clients 110. (These roles will be reversed when transitioning back from client side mode to server side mode.) The transition includes reassigning one of the subsets of the global state from a first member of the plurality of clients to a second member of the plurality of clients. As such, the subset will be sent to the second member instead of or in addition to the first member of the plurality of clients. In addition, Transition Logic 180B is configured to change the assignment of received communications to game sessions, such that communications from the second member of the plurality of clients are assigned to the same game session as communications from the first member of the plurality of clients were assigned to. In some embodiments, a single game session and/or game state subset can be assigned to more than one client at the same time. In these cases game commands received from both clients are assigned to the same game session and the same subset of the global game state is sent to both clients. Game commands received from both clients are treated as if they were received from the same client.

As is described elsewhere herein, the transition can involve receiving a request to reassign a game session from Video Server System 120. This request typically includes an IP address or some other address of one of Clients 110 to which the reassignment is to be made. In some embodiments, Transition Logic 180B is configured to accept reassignment requests only from specific predetermined clients. For example, Transition Logic 180B may be configured to accept reassignment requests from instances of Video Server System 120 but not instances of Client 110. The reassignment requests are optionally encrypted and/or may include an authorization code.

Game Server 125 further includes a State Storage 330 configured to store the global state and subsets thereof. State Storage 330 includes one or more static storage devices such as a hard drive, static memory, random access memory, and/or the like. The global state is optionally divided into several parts each representing a different region within a game.

Figure 4:
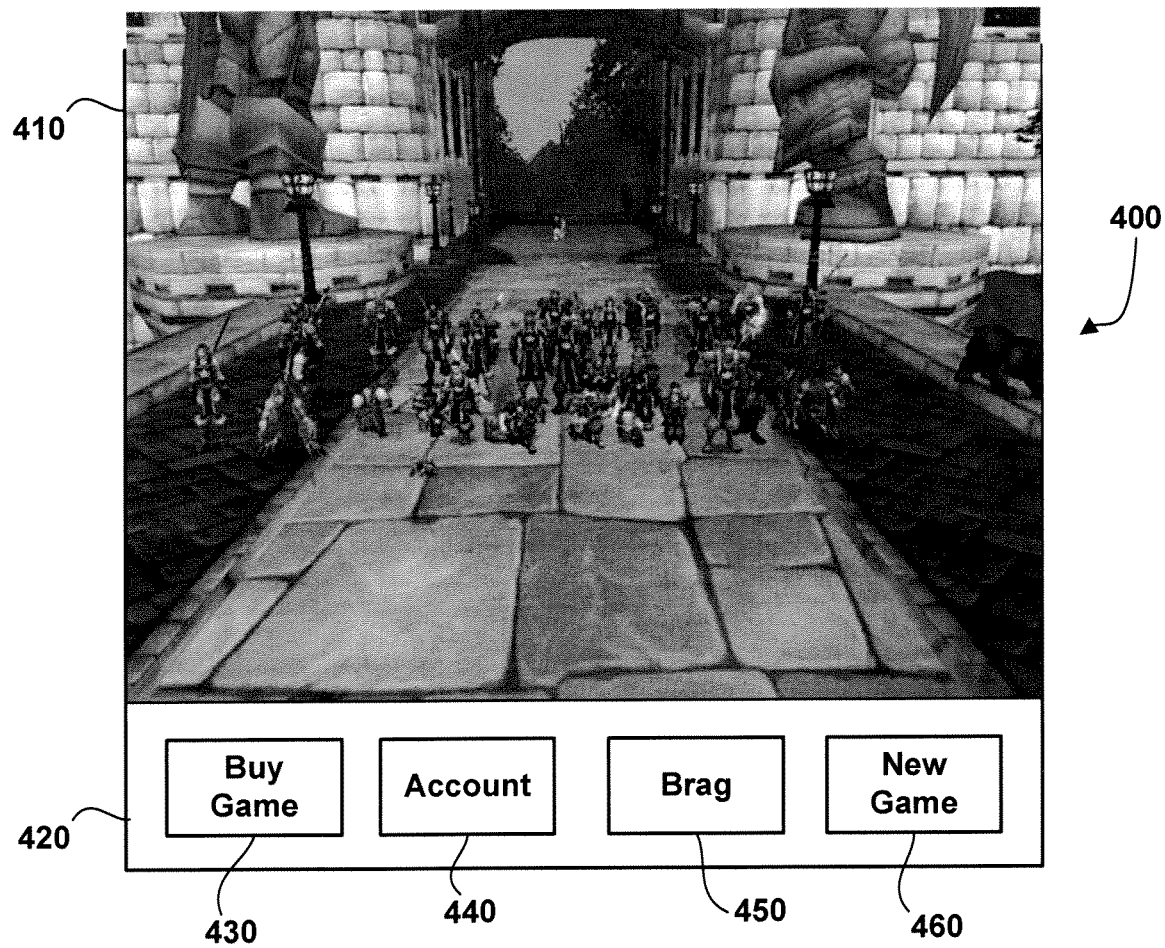
FIG. 4 illustrates a user interface, according to various embodiments of the invention.

FIG. 4 illustrates a User Interface 400 according to various embodiments of the invention. In some embodiments, User Interface 400 is generated by Video Source 130. User Interface 400 may consist of a single video presented in a browser or other window. User Interface 400 may alternatively include more than one video and/or combinations of video and static images. For example, streaming game video may be presented in a Game Display Area 410 while, controls are displayed in a Menu Area 420. The controls and streaming game video are optionally generated at different locations. For example, the controls may be generated on Client 110B while the streaming video is generated by Video Source 130. In some embodiments, Game Display Area 410 and Menu Area 420 are different frames within a browser window.

Menu Area 420 can include a wide variety of controls, a few of which are shown for illustrative purposes. The controls shown in FIG. 4 are optionally overlaid on part of the streaming game video. Clicking, cursor over, or otherwise selecting a control can result in a command being communicated to Transition Logic 180C, Transition Logic 180B, Transition Logic 180A, Download Manager 165, Account Manager 185, and/or the like.

In the illustrated example, Menu Area 420 includes a Buy Button 430 configured for a game player to purchase a video game. In some embodiments, this purchase can be made without interrupting game play. For example, streaming game video can continue to be presented to the game player in Display Area 410 while the purchase (entry of name and credit card information, and/or the like) is accomplished in Menu Area 420. Purchasing the game can result in the initiation of the transition between server side mode and client side mode, can result in activation of downloaded executable game content, can cause the downloading of executable game content to be initiated, etc. Purchasing a game typically requires that a game player provide account information.

In the illustrated example, Menu Area 420 also includes an Account Button 440. Account Button 440 can be used to access features of Account Manager 185. In various embodiments, Account Button 440 is used to set an account name, create avatars, choose servers, make payments, set passwords, switch between games, and/or the like. The information provided by a game player using Account Button 440 (or Buy Button 430) can be stored at Video Server System 120, Game Server 125, or elsewhere within Game System 100.

In a typical embodiment, selecting Account Button 440 or Buy Button 430 will result in a command being sent to Video Server System 120 which, in turn, will change the contents of Menu Area 420 to give the game player further options and/or data entry fields.

In the illustrated example, Menu Area 420 also includes a Brag Button 450. Brag Button 450 is configured for a game player to automatically post game video to an external website, such as a social networking site. The location that video is posted and the length of the posted video are examples of parameters that are optionally set using the Account Button 440. The posted video can be live or recorded. For example, the Brag Button can be configured to post the last 60 seconds of play, 2 minutes of play before killing a boss, or real time video of a game. The video selected for posting is optionally dependent on the output of an Add-on configured to monitor game play, e.g., to detect a boss encounter, an achievement, a change in level, etc.

In the illustrated example Menu Area 420 further includes a New Game Button 460. New Game Button 460 is configured to present to a game player a list of other video games available through Game System 100. Typically, if the game player selects a new game, delivery of video from the current game is terminated and replaced by video from the new game. Video from the current game and the new game are optionally displayed sequentially in the same browser window. Account Manager 185 is optionally configured to copy game player account information from one video game to another. New Game Button 460 is optionally configured for a game player to move, without substantial delay, from one video game to another. When a new game is started the game session is optionally assigned to a different instance of Game Logic 210 or a different instance of Video Source 130. This assignment can involve passing the IP address of the client from the assignor to the assignee.

Figure 5:
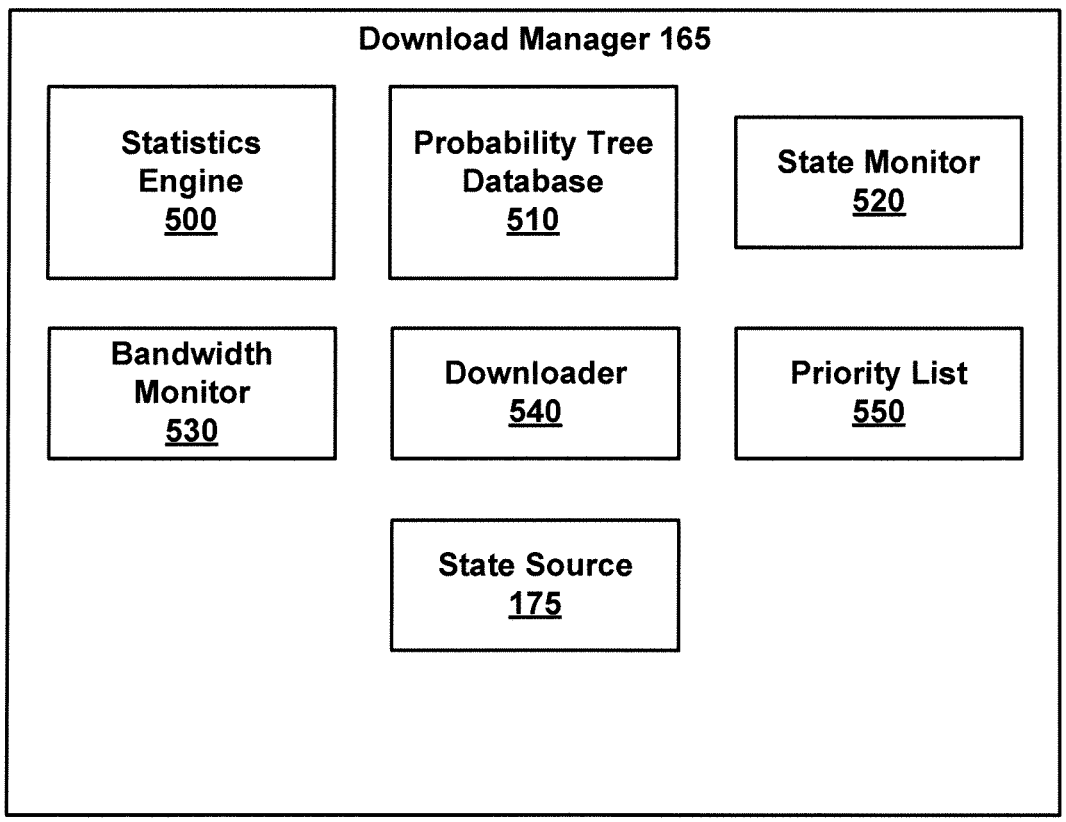
FIG. 5 illustrates further details of a download manager, according to various embodiments of the invention.

As noted previously, Download Manager 165 is configured to perform various functions related to downloading executable game content to the Client 110B. FIG. 5 illustrates an exemplary Download Manager 165, according to various embodiments of the invention. Download Manager 165 can comprise some or all of a Statistics Engine 500, a Probability Tree Database 510, a State Monitor 520, a Bandwidth Monitor 530, a Downloader 540, and a Priority List 550. In particular, the Downloader 540 receives inputs such as from Monitors 520, 530 and also accesses Probability Tree Database 510 to control aspects of the downloading of the executable game content, for instance, the order in which the executable game content is downloaded, and at what rate.

Figure 6:
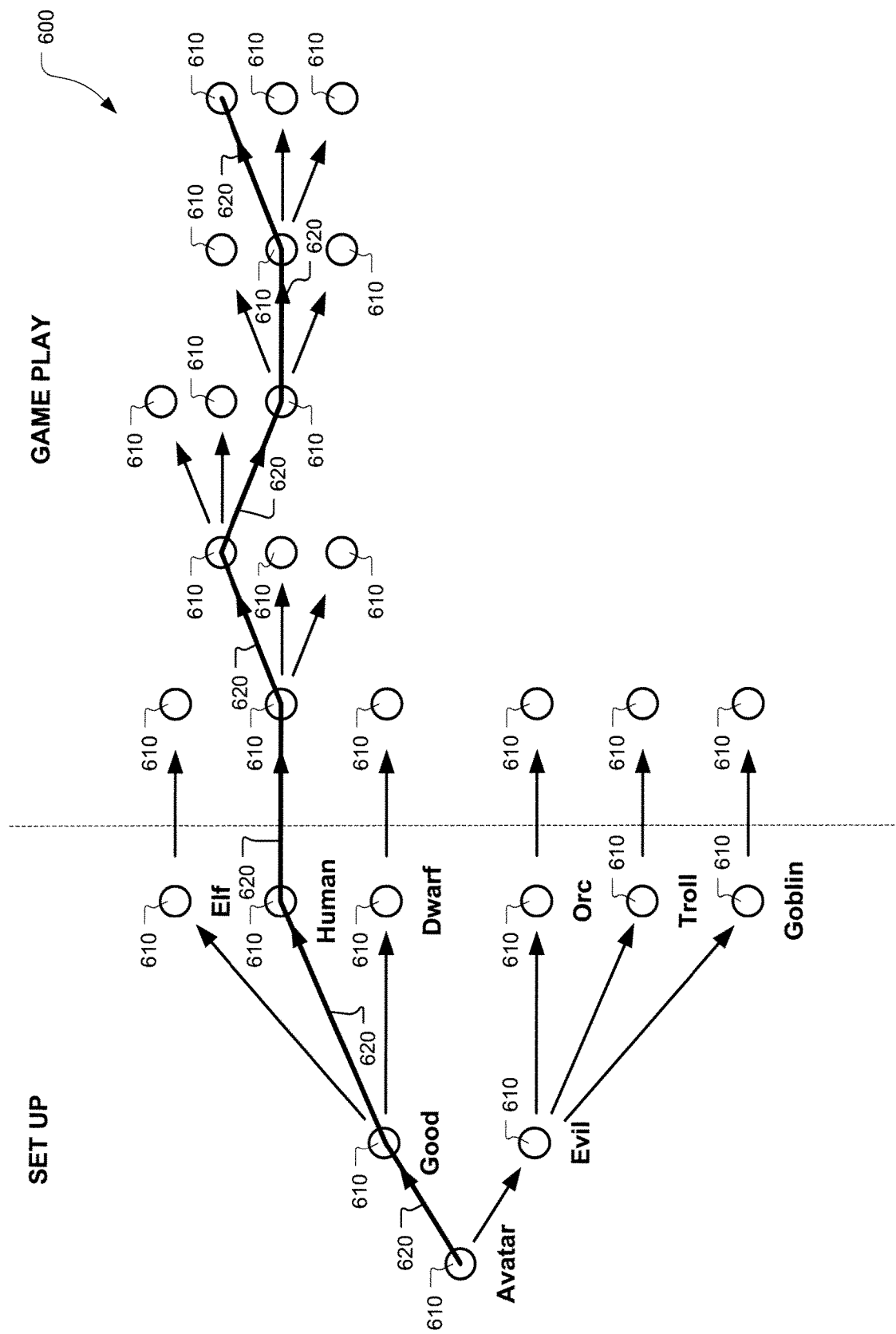
FIG. 6 illustrates a decision tree, according to various embodiments of the invention.

FIG. 6 illustrates a Decision Tree 600, according to various embodiments of the invention, and is provided to assist the understanding of some of the functions of the Download Manager 165 described herein, for example, with respect to FIG. 5. The Decision Tree 600 comprises Branching Points 610 from which a game state can advance to any of several alternative game states based on game player input, input from other game players and according to rules specified by the executable game content or Game Logic 210. Branching Points 610 lead to more Branching Points 610, creating the overall Decision Tree 600. It will be appreciated that each Branching Point 610 represents a unique game state, but that game play may progress through game states that are not Branching Points 610 in those instances where the rules embodied in the executable game content do not provide alternatives. Game states from which there are no alternative game states are omitted from FIG. 6 for clarity. In practice a computer game may include many more Branching Points 610 than are illustrated in FIG. 6.

The alternatives from each Branching Point 610 are determined by the executable game content. Initially, in a setup phase the options are limited, for example, a game player of a fantasy game may first have to select one of a set number of possible avatars. Having selected an avatar, the game player next may have the option to select between two or more alignments or alliances. Depending on that selection, the game player may have different choices of character races, starting configurations, and so forth, until the game player's avatar is sufficiently defined for the purposes of game play. In a specific example if a game player selects a human avatar, then it is known with high probability that the game will require executable game content associated with a human starting zone, and that it is less likely that, in the near term, resources associated with an Orc starting zone will be required. In another example, if a game player selects an oval track in a race game, then resources required for this oval track are given greater priority for downloading relative to resources required only for a figure eight track. Other types of games may have different setup choices, e.g., vehicle type, race track, battle ground, number of players, avatar armament, avatar skills, avatar sex, etc. The game player then progresses from Set Up to Game Play, for example, by being placed into a game state. For simplicity, FIG. 6 shows each final Branching Point 610 in the Set Up as mapping to a unique initial game state in the Game Play. It will be understood, however, that multiple final Branching Points 610 in the Set Up may map to the same initial game state in the Game Play. Each of the Branching Points 610 is known to require a specific set of resources for proper game play.

From the initial game state, which can be a Branching Point 610, options available to the game player to engage in game play include moving to different locations, interacting with other game players, interacting with features within the game environment, acquiring objects, making money, and so forth. Game player inputs, e.g., game commands, resulting from the game player engaging in game play cause the game state to change incrementally, as illustrated in FIG. 6. In some embodiments, actions of other game players can cause a change in the game state. Other options provided by the executable game content to progress from a particular game state can additionally include the ability to revert back to a Branching Point 610 within the Set Up, to change game levels, and to take other such actions that would remove the avatar from a game state. For simplicity, the branching in FIG. 6 is shown as always advancing forward, however, as just described, the branching from any Branching Point 610 can be complex and optionally can lead, for instance, to Branching Points 610 located in the Set Up or in alternate levels. The history of a game player's progression from one Branching Point 610 to the next constitutes a Game Path 620 for that game player.

At each Branching Point 610 there is a set of probabilities representing the change that the Game Path 620 will next lead to each of the different alternative game states, and then further game states beyond those. In a specific example, at one Branching Point 610 there may be 25 different alternative game states to which the Game Path 620 could continue. The probability that the Game Path 620 will lead to, responsive to received game commands, the first two of these 25 Branching Points 610 have a 21 and 9 percent probability respectively. The next 23 of the alternatives each have a 3 percent probability. There is also a 1 percent probability that the game player will pause or quit the game. These probabilities may be dependent on the path taken to reach the one Branching Point 610. The probability of reaching a Branching Point 610 several steps away from a current Branching Point 610 can be calculated by multiplying probabilities. Methods of determining these probabilities are disclosed elsewhere herein.

With renewed reference to FIG. 5, optional Statistics Engine 500 is configured to calculate the statistical likelihood that a game player at a current game state will move to each of the other game states that are one step removed from the current game state. The Statistics Engine 500 optionally performs this calculation by monitoring the game play of a large number of game players over an extended period of time. The larger the number of game players and the longer the monitoring period, the better the statistical significance of the results. For a given game state, some possible game states will be very probable while other game states will be less probable. For example, the likelihood that a game player will return to a game state within Set Up will generally be a small probability while options that advance the avatar through the current game level will be higher probabilities. There is also a probability that a game player will exit a game. The Statistics Engine 500 updates the probabilities in the Probability Tree Database 510 over time as the game play of multiple game players is continually monitored. A single instance of Statistics Engine 500 may support a large number of Download Mangers 165. Statistics Engine 500 is optionally disposed geographically remote from other parts of Download Manager 165.

In some embodiments, the Statistics Engine 500 makes this calculation for some or all of the alternative game states that are one step removed from the current game state. In some further embodiments, the Statistics Engine 500 makes this calculation for some or all of the alternative game states that are more than one step removed from the current game state. In various embodiments, the Statistics Engine 500 calculates the probability of each alternative game state based on the current game state and/or based on one or more previous game states along the Game Path 620. For instance, the probability of advancing to a particular game state can vary based on how the game player arrived at the current game state.

Although the Statistics Engine 500 is shown as being within the Download Manager 165 in FIG. 5, it will be understood that the Statistics Engine 500 can be distributed across multiple Game Servers 125, each instantiation contributing to the Probability Tree Database 510 based on the game play supported by that Game Server 125. Each instantiation of the Statistics Engine 500 may include hardware, firmware, and/or software stored on a computer readable medium. Probability Tree Database 510 comprises an organized and searchable collection of data stored on a computer-readable medium. In various embodiments each Download Manager 165 may include a copy of the Probability Tree Database 510 or each may simply have access to a shared Probability Tree Database 510. As the probabilities stored in the Probability Tree Database 510 can be reasonably static after a sufficient period of monitoring the game play of a sufficient number of game players, in various embodiments the Download Manger 165 does not comprise the Statistics Engine 500 and/or the Probability Tree Database 510 is not updated responsive to further game play.

Download Manager 165 additionally comprises a State Monitor 520. The State Monitor 520 is configured to keep track of the game state and optionally prior Branching Points 610 along the Game Path 620. Download Manager 165 optionally further comprises a Bandwidth Monitor 530. The State Monitor 520 is configured to receive the game state from the Game Server 125 or State Source 175, in various embodiments. State Monitor 520 optionally monitors the game states used by Game Logic 210 to generate game video. State Monitor 520 is configured to provide the game state to Statistics Engine 500 such that Statistics Engine 500 can perform the probability calculations.

The Bandwidth Monitor 530 monitors the bandwidth of the communication channel between, for example, the Video Server System 120 and the Client 110B. The State Monitor 520 and the Bandwidth Monitor 530 may each include hardware, firmware, and/or software stored on a computer readable medium. Bandwidth Monitor 530 monitor bandwidth by detecting lost packets, by measuring latency, by testing to see if increased communication rates result in lost packets, by sending test packets, and/or the like. Other bandwidth testing methods that may be used by Bandwidth Monitor 530 are disclosed in commonly owned U.S. patent application Ser. No. 12/791,819 and/or discussed elsewhere herein with respect to Client Qualifier 160.

Further, the Download Manager 165 comprises Downloader 540. Downloader 540 is configured to receive input from the State Monitor 520, and optionally from the Bandwidth Monitor 530, and is further configured to access the Probability Tree Database 510. Downloader 540 queries the Probability Tree Database 510 to determine, for the game state received from the State Monitor 520, what the probabilities are of each of the possible alternatives from that game state. Optionally, Downloader 540 may determine, for each of the possible alternative game states, what the probabilities are of each of the possible alternatives from those game states. For example, if two possible game states are statistically likely while the remaining game states are statistically highly unlikely, the Downloader 540 may look at each of the two alternatives and consider further alternatives from both.

Given a game state, and optionally one or more prior Branching Points 610, the Downloader 540 uses the probabilities of each of the possible alternatives from that game state to dynamically prioritize the order with which executable game content will be downloaded. The Downloader 540 maintains a Priority List 550 which provides the order in which parts of the executable game content will be downloaded. The Downloader 540 optionally varies the order within the Priority List 550 as parts of the executable game content are downloaded and the game state changes. The Downloader 540 maintains the Priority List 550 according to certain rules. For example, partially downloaded segments of the executable game content may be given priority to complete downloading even though those segments pertain to game states that may have become less likely than other game states. As another example, those parts of the executable game content required to support a game state that has the greatest probability will have the highest priority for downloading, and parts of the executable game content required to support game states with lower probabilities will have correspondingly lower downloading priorities. The parts of the executable game content can be divided by directories, files and/or sub-parts of files.

The Downloader 540, in some embodiments, regulates the rate at which executable game content is downloaded, as discussed elsewhere herein. The Downloader 540 regulates the download rate according to the bandwidth provided by the Bandwidth Monitor 530 and optionally other information from the Video Server System 120 such as the amount of bandwidth used to provide the streaming game video.

The Downloader 540 optionally is configured to initiate execution of the downloaded code on Client 110B using the Transition Logic 180 as described elsewhere herein. In some embodiments, after the execution of the downloaded code on Client 110B has been initiated, and streaming game video is no longer being sent by the Video Server System 120 to the Client 110B, the Downloader 540 may continue to download the game code to the Client 110B according to the Priority List 550. In some of these embodiments, the Downloader 540 continues to receive the game state and continues to dynamically vary the order of the Priority List 550 until downloading the entire game code to the Client 110B has completed.

Figure 7:
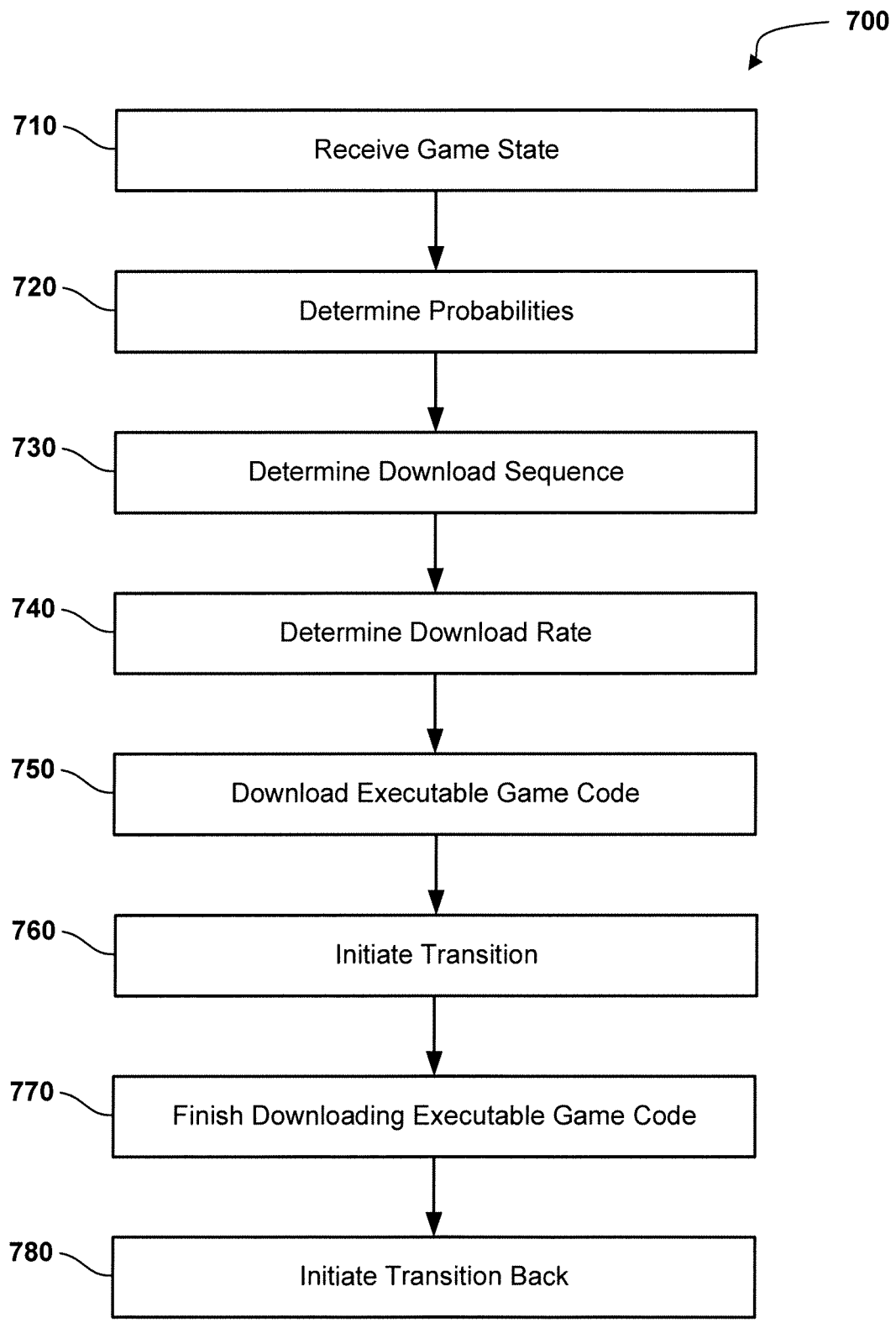
FIG. 7 illustrates a method for downloading executable game content, according to various embodiments of the invention.

FIG. 7 illustrates a Method 700 for downloading executable game content according to exemplary embodiments of the invention. Method 700 can be performed by Download Manger 165, for example. Method 700 comprises a Step 710 of Receiving a Game State, a Step 720 of Determining Probabilities, and a Step 730 of Determining a Download Sequence. Each time a new game state is received in Step 710 new probabilities are optionally determined in Step 720, for example, by querying Probability Tree Database 510. However, in many instances the progression from one game state to the next will not require a reordering of the download sequence in Step 730. In some instances, however, game play may take a probabilistically less likely turn (relative to expected play) based on input received from the game player or other game players. In these cases one or more parts of the executable game content are given new higher priorities, for example, within Priority List 550, while other parts of the executable game content are given new lower priorities. In various embodiments, the times at which probabilities and/or Priority List 550 are recalculated may be based on a set time period (e.g., 1, 5 or 10 minutes), an avatar leaving a region within the game, distance traveled by an avatar, crossing of a boundary within a game environment, specific actions performed by an avatar, reaching specific states, changes in avatar level, and/or the like.

The Method 700 may further comprise an optional Step 740 of determining a download rate for downloading executable game content. Step 740 includes monitoring a bandwidth of a communication channel, in some embodiments. In some embodiments, Step 740 can include receiving a bandwidth from Bandwidth Monitor 530. As discussed elsewhere herein, the download rate can be determined based on available bandwidth and bandwidth required to provide streaming video at a minimal level of quality.

The Method 700 further comprises a Step 750 of downloading executable game content. In various embodiments Step 750 comprises communicating parts of the executable game content over Network 115 to Client 110B according to the dynamically ordered priority list from Step 730. This step can be performed, for instance, by Downloader 540. In various embodiments the parts of the executable game content are retrieved from Code Source 170 and sent to Client 110B, according to the order specified by the priority list. In some of these embodiments the executable game content is first queued, and the order of the executable game content within the queue is dynamically reordered as the priority list is reordered.

In some instances Step 750 includes varying the download rate. The download rate can be varied, for example, based on factors such as changing bandwidth availability, such as by the Downloader 540. The amount of available bandwidth can vary due to both channel variability and changes in the bandwidth requirement of the streaming video. For example, at certain times the streaming video may require fewer frames per second than at other times, and the download rate can be increased to take advantage of the additional available bandwidth.

In some embodiments, certain conditions result in giving a greater priority to downloading of executable game content relative to the provision of streaming video. For example, if it is very likely that execution of the game in client side mode will be interrupted because a resource is not available, then more priority may be given to downloading that resource relative to maintaining the minimum quality of game video presented to a game player. In some embodiments, frame rate, frame size, color depth, or some other feature of the game video may be changed such that the amount of video (in bits/sec) downloaded is reduced. This results in more bandwidth being available for downloading executable game content. In a specific example, if Download Manager 165 determines that a required resource is likely not to be available when needed, Download Manager 165 is configured to send an instruction to Video Source 130 indicating that the frame rate of streaming video provided to Client 110B should be reduced to increase the probability that the resource will be downloaded before it is needed. The amount that the frame rate is reduced is optionally calculated based on an amount of time expected to be needed to download the required resource. In alternative embodiments, play of the game is "frozen" while in client side mode in order to assure that required resources are downloaded before they are needed. In alternative embodiments, play of the game is switch from client side mode to server side mode if it is likely that a required resource will not be available on Client 110B when needed for client side execution.

In some embodiments, resources are differentiated as to their need for proper game play. For example, the geometry of the ground and/or objects in an area of a game can be considered absolutely required for proper game play, while a texture intended to be applied to an in game object may not be absolutely necessary. In these embodiments, if Download Manager 165 determines that a required resource is likely not to be available when needed an alternative resource may be used instead. For example, a texture meant for an interior wall may be used on the exterior of a building, or an unnecessary object may be omitted from the video provided to a game player. A table of allowed resource substitutions is optionally provided by Download manager 165 to Client 110B. Necessary resources may be given greater priority for downloading to Client 110B relative to resources that are not necessary. As used herein, the term "proper game play" indicates that the game appears and plays as intended. Game play that is not proper may have alternative textures, missing game objects, etc. that still allow game play with a slightly different appearance or functionality.

The Method 700 optionally further comprises a Step 760 of initiating a transition from a server side mode of game execution to a client side mode of game execution. Step 760 may comprise, for example, determining a probability of needing any part of the executable game content is lower than a given threshold, before that part will be downloaded. This probability is related to the probability that a game state will be reached that requires a part of the executable game content and the probability of when this game state will be reached. The greater the amount of time before a resource will be need, the more likely there will be an opportunity to download the resource before it is needed. In various embodiments, if the probability that any resource will be needed before it is downloaded is lower than a threshold of 1, 2 or 5 percent then an "executable subset" of the executable game content will be considered to have been downloaded to the client. In these embodiments, the characterization of an executable subset includes consideration of what resources are likely to be needed in the future and the probability of downloading these resources by the time they are needed. The executable subset is, thus, dependent on a current state of the game. In other embodiments, an executable subset is considered to be downloaded when a minimal executable set of resources has been downloaded to the client, without regard to what will be needed in the future.

When an executable subset is downloaded, Transition Logic 180 can initiate transition to the client side mode of game execution. Step 760 may include, for example, terminating delivery of the streaming video from the video server to the client and beginning executing the executable game content on the client to generate the video based on the game state. Each of Steps 710-760 can be performed while streaming video is being provided to the client.

Method 700 optionally further comprises a Step 770 of finish download of executable game content. In this step the executable game content can continue to be downloaded to the client after Step 760, e.g., after transitioning to the client side mode. In some of these embodiments the executable game content can be downloaded according to the download sequence as it existed at the time of Step 760. In other embodiments, during Step 770, the download sequence continues to be dynamically varied using Step 730 according to the game state. In these embodiments the game state, as maintained on Client 110B, is communicated back to Download Manager 165. Step 730 can be used to vary the order in which parts of the executable game content is downloaded to Client 110B even after execution of the executable subset has begun on Client 110B.

Optionally, the Method 700 can comprise a Step 780 of initiating a transition back to having streaming video provided to the client. This step can be performed in instances where the game state continues to be received, such as by Downloader 540, after the end of Step 760. Here, if the Downloader 540 determines that, based on the game state, that a part of the executable game content that has not yet been downloaded to the client has a significant probability of being needed to support ongoing game play, then Transition Logic 180, for example, can transition the client away from the client side mode of game execution and back to server side game execution. It will be appreciated that although Step 780 is shown in FIG. 7 as following Step 770, in those instances where Step 780 is taken, the step occurs before Step 770 completes. In these instances Step 770 is interrupted, and the Method 700 returns to Step 710 and continues to stream video to the client while downloading executable game content to the client until such time as Step 760 recurs to transition back to the client side mode of game execution.

Figure 8:
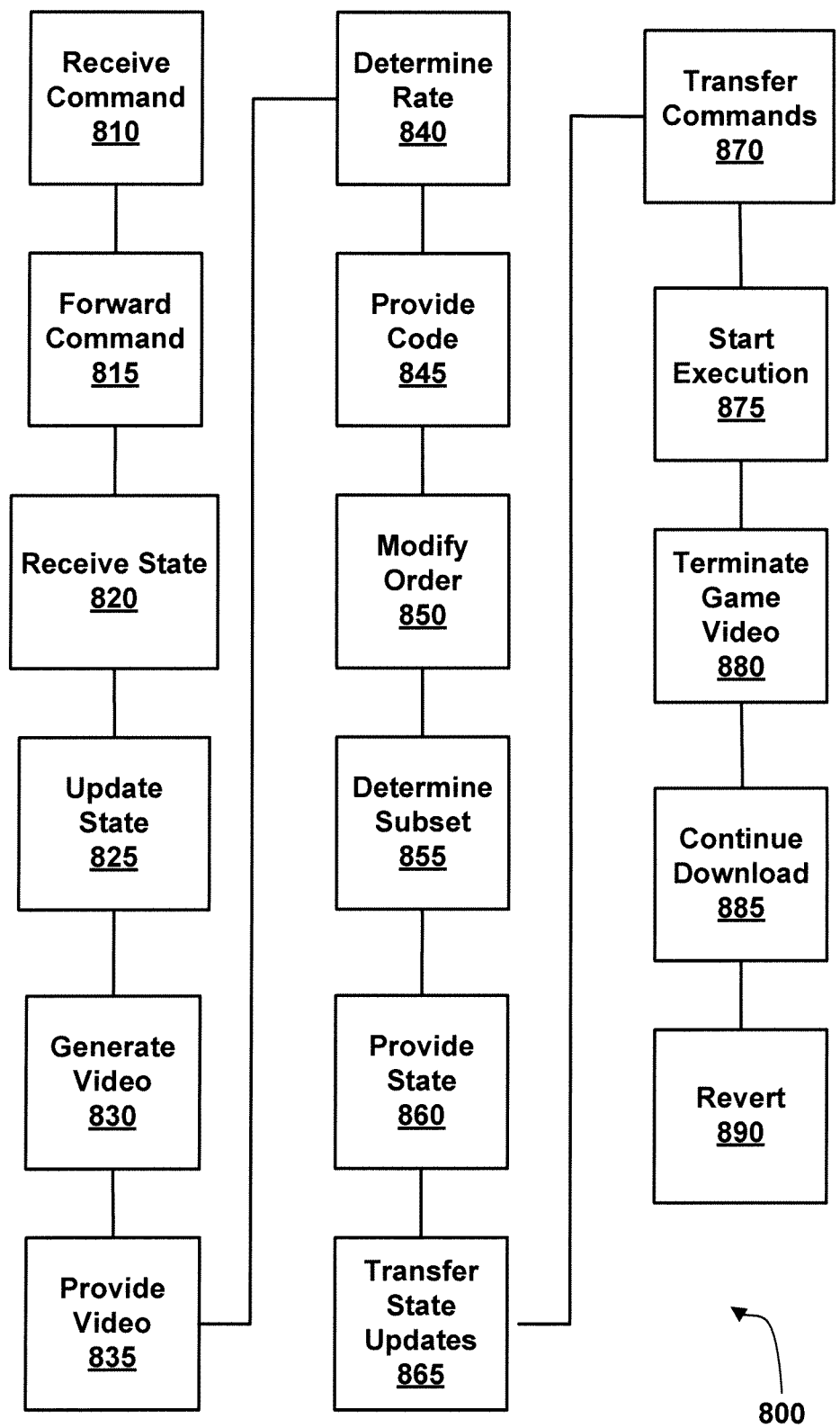
FIG. 8 illustrates methods of providing a computer game, according to various embodiments of the invention.

FIG. 8 illustrates methods of providing a computer game, according to various embodiments of the invention. These methods are optionally performed using the systems and methods disclosed elsewhere herein. In a Receive Command Step 810, a game command is received from a remote client over a communication system at a video server system. For example, in some embodiments, Video Server System 120 receives the game command from Client 110B over Network 115. Receipt of the game command is part of a game session established between Client 110B and Video Server System 120. The steps illustrated in FIG. 8 are optionally performed in alternative orders.

In an optional Forward Command Step 815, the received game command is forwarded to a game server (e.g., Game Server 125). The received game command is optionally forward to Game Server 125 via Network 115. In an optional Receive State Step 820, an updated game state is received at the video server system from the game server. The received game state is optionally a subset of a global game state maintained by Game Server 125, and is optionally updated using the game command forwarded in Forward Command Step 815. In a multiplayer game the received subset is typically the result of game commands received from multiple game players and/or multiple Clients 110.

Forward Command Step 815 and Receive State Step 820 are optionally in embodiments that do not include Game Server 125. In these embodiments an Update State Step 825 is performed on Video Server System 120. Update State Step 825 includes using the game command received from Client 110B to update a game state stored on Video Server System 120. The update is optionally performed using the game rules of one of Game Logic 210.

In a Generate Video Step 830, game video is generated based on the game state received in Receive State Step 820 or the game state updated in Update State Step 825. The game video is optionally generated using Video Server System 120 as described elsewhere herein, for example with respect to FIG. 2. For example, in some embodiments, the game video is generated using Video Driver 220, the 3D Driver 230, GPU 235 and/or Video DEP 245A based on a game environment generated by Game Logic 210.

In a Provide Video Step 835, game video is provided from the video server system to the remote client over a communication network. For example, the game video may be provided from Video Server System 120 to Client 110B via the Network 115. The game video is typically provided in a format for display on Client 110B. Although the game video is optionally decoded, overlaid and/or otherwise processed before display.

In a Determine Rate Step 840, a rate at which executable game content can be transferred to the client is determined. This determination is optionally based on maintaining a minimum level of quality for displaying the game video at the client while transferring the executable content in parallel. For example, executable content may be transferred from Video Server System 120 (or elsewhere on Game System 100) to Client 110B via the Network 115 while streaming game video is provided to Client 110B in parallel. The parallel transfer of executable game content and delivery of game video means that packets of the game video are received at the same time as, or interspersed between, packets of the executable game content. Optionally, packets of the game video and packets of the executable game content are both stored in a receive buffer of Client 110B at the same time. Determine Rate Step 840 is optionally performed using Download Manager 165. As discussed elsewhere herein, the determination of the transfer rate may be based on the available bandwidth of the communication channel between Video Server System 120 and Client 110B, and/or the fraction of this bandwidth used to provide the streaming game video.

The determination of the transfer rate in Determine Rate Step 840 may be repeated to maintain the game video quality as the executable game content is transferred to Client 110B.

In a Provide Code Step 845, executable game content is provided to the remote client over the communication network. For example, in some embodiments, executable game content is transferred from the Code Source 170 to Client 110B via the Network 115. As used herein, the terms "executable game content" and "executable content" are meant to include executable code as well as related resources used to generate the game (or other application) video such as, for example, scripts, data structures, images, textures, geographic information, character names, object shapes, user data, game data, etc. The executable game content is generally provided at no more than the rate determined in Determine Rate Step 840 as discussed elsewhere herein. The executable game content includes game logic and/or code configured to generate game video based on a game state. The game code optionally further includes textures, images, geographic data of a game zone, and/or other game data used to support the game. At least part of the executable game content and a stream of the game video are provided to the remote client in parallel. For example, executable game content from the Code Source 170 may be transferred to Client 110B via the Network 115 in parallel with game video from the Video Source 130. Alternatively, executable game content and game video may be transferred in parallel to Client 110B via separate channels.

Thus, as the available bandwidth changes, the ratio (as measured in bytes/second) of streaming game video to executable content received by Client 110 can vary. The Download Manager 165 may repeat the determination of the transfer rate periodically, for example, at least every second, every ten seconds, every hundred seconds, every 10 frames, every 1000 frames, every 100 frames, or continuously. In some embodiments, the Download Manager 165 may repeat Step 840 in response to an event such as receiving a signal from the Video Source 130 indicating the data rate of the game video or a change in the data rate of the game video. The Download Manager 165 may repeat Step 840 in response to a change in conditions such as a change in Client 110B requirements (e.g., limits to lag time variability, a change in bandwidth of communication channels between Client 110B and Video Server System 120, a change in the display resolution, etc.)

In Provide Code Step 845 parts of the executable game content may be provided to the remote client in a predetermined specific order. For example, Client 110B may have a greater probability of reaching a first game state relative to a second game state. Resources needed at the first game state may, therefore be given greater priority relative to resources need at the second game state.

In an optional Modify Order Step 850, the order in which parts of the executable game content are provided to the remote client is dynamically modified in response to a current game state. As discussed elsewhere herein, reordering is typically based on the varying probabilities that game code or some other resource will be needed as a player plays a game. When a game changes from one state to another, new probabilities for future game states are calculated by Download Manager 165. In Modify Order Step 850 these new probabilities are used to modify the order in which the parts of the game code are provided to Client 110B such that those parts with the greatest probability of being needed are provided first. The Download Manager 165 may modify the order for providing parts of the executable game content repeatedly during downloading of the game code. Modify Order Step 850 may be repeated as needed. The modified order can be dependent on actions taken by the game player to whom the executable content is being downloaded, and/or actions taken by other game players within the game.

In a Determine Subset Step 855, the Download Manager 165 determines if an executable subset of the executable game content has been downloaded to the remote client, e.g., Client 110B. An executable subset of the executable game content is a subset that will allow a game player to play the game with a reasonable probability that the game will not have to be halted because a required resource is not yet downloaded. The required probability can be predetermined and in various embodiments is at least 99, 98, 95, 90, or 85 percent. Determine Subset Step 855 is optional in embodiments wherein all of the executable game content is downloaded before rendering of game video is transferred to the client.

In Provide State Step 860, the state of the game is provided to the remote client. The state of the game may be provided to the client over time. For example, in some embodiments, Provide State Step 860 includes providing an initial game state and then providing updates to the initial state over time. Alternatively, Provide State Step 860 can include providing a single current state. The provided game state can be the result of game commands received from Client 110B and/or other members of Clients 110. The game state can be provided from Game Server 125 and/or Video Server System 120.

In a Transfer State Updates Step 865, the delivery of game state updates are changed such that they are sent from Game Server 125 to Client 110B rather than from Game Server 125 to Video Server System 120. There is optionally a period of time in which game state updates are sent to both Client 110B and Video Server System 120. The game state updates are subsets of the global game state maintained on Game Server 125 an used at Video Server System 120 and Client 110B to generate game video. The game state updates can be incremental and/or total. Transfer State Updates Step 865 is typically performed by Transition Logic 180.

Transfer State Updates Step 865 includes providing an address of Client 110B, e.g., an IP address, to Game Server 125 along with instructions that the game state updates associated with a particular game session should be sent to this address. At Game Server 125 the provided address is associated with a previously existing game session. For example, the address of Client 110B is assigned to a game session that previously existed between Game Server 125 and Video Server System 120. In this game session the game state updates were previously sent from Game Server 125 to Video Server System 120. The result of Transfer State Updates Step 865 is that subsets of the global game state are sent to Client 110B in addition to or instead of Video Server system 120. This change is optionally performed within a single game session.

In a Transfer Commands Step 870, instructions are provided by Transition Logic 180 to Game Server 125 such that the game server assigns commands received from the remote client to the game session that was previously established between Game Server 125 and Video Server System 120. The commands received from Client 110B are typically identified using the IP address of Client 110B, although other identifiers can be used. The instructions provided to Game server 125 thus optionally include an IP address of Client 110B.

Further, in Transfer Commands Step 870, Client 110B is instructed to send game commands to Game Server 125 rather than or in addition to Video Server System 120. This instruction typically includes an address of Game Server 125. For example, Transition Logic 180A may provide an IP address of Game Server 125 to Client 110B and may instruct Client 110B (e. g., via the Transition Logic 180C) to send game commands directly to the Game Server 125.

Transfer State Updates Step 865 and Transfer Commands Step 870 are optional. In some embodiments, the communication of game states and game commands between Game Server 125 and Client 110B continues to occur through Video Server System 120, even after the transition from streaming mode to client mode. Continuing to communicate though Video Server System 120 may be helpful in situations where it is likely that a transition back to streaming mode may occur.

In a Start Execution Step 875, execution of the executable subset of the executable game content is started on Client 110B. This execution results in the generation of game video based on the game states received as a result of Provide State Step 860 and Transfer State Updates Step 865. This game video is configured to be displayed on Client 110B. The execution of the game code is optionally initiated by or under the control of Transition Logic 180A. Start Execution Step 875 is performed only after an executable subset (or all) of the executable game content has been downloaded to the client, as determined in Determine Subset Step 855. In some embodiments, Provide Code Step 845 continues to be performed even after Start Execution Step 875. This allows for a remainder of the executable game content and/or new game code to be downloaded after execution has commenced.

The result of Provide State Step 860, Transfer State Updates Step 865, Transfer Commands Step 870 and Start Execution Step 875 is that execution of the computer game is transitioned from the server side mode to a client side mode, where rendering takes place using game code and hardware on the client instead of a remote server. Specifically, the rendering of game video is transferred from the game server to the remote client, e.g., from Video Server System 120 to Client 110B. As is discussed elsewhere herein, game video may be both received from Video Server System 120 and generated at Client 110B in parallel for a period of time. This can allow synchronization of the video and/or allow a game player to switch from playing the video game in a browser to a different window (which could also be a browser window) at a time of the game player's choosing.

In a Terminate Game Video Step 880, delivery of game video from the video server system to the remote client is terminated. For example, Transition Logic 180A may instruct the Download Manager 165 to terminate provision of the game video from Video Server System 120 to Client 110B. In alternative embodiments Terminate Game Video Step 880 is performed manually. For example, a game player may terminate delivery of the game video by merely closing a browser window in which the game video is displayed, or by manually executing downloaded executable game content that is configured to terminate the delivery of the game video from Video Server System 120 by either sending a command to Video Server System 120 or locally closing the communication channel to Video Server System 120.

In Continue Download Step 885, further and/or new parts of the executable game content are downloaded to the remote client. The Download Manager 165 may continue to provide portions of the executable game content to Client 110B while that part of the executable game content already downloaded to Client 110B is executed. As such, Client 110B receives executable game content while at the same time rendering and presenting game video to a game player using part of the executable game content that has already been downloaded. Once video is no longer being provided to Client 110B from Video Server System 120 via the Network 115, the portion of the bandwidth available for transfer of the executable game content to Client 110B is typically substantially increased. Continue Download Step 885 is optional in embodiments in which all of the executable game content is downloaded before Start Execution Step 875.

In an optional Revert Step 890, the video server system reverts from client side mode to server side mode. The delivery of streaming game video to Client 110B from Video Server System 120 is restarted, and the rendering of game video at Client 110B is optionally terminated. Revert Step 890 may occur, for example, when the executable game content subset resident in Client 110B is no longer capable of rendering the video for current game state and/or likely future game states. Revert Step 890 can be accomplished through steps similar to the Steps 860-885 as discussed above, except that the transitions occur in a generally reverse direction. Execution of Steps 850-890 may be performed repeatedly. As such, a video game can switch between client side and server side modes multiple times. In some embodiments, this switch occurs when the video game changes between a two dimensional mode and a three dimensional mode, or between some other change in video output.

Figure 9:
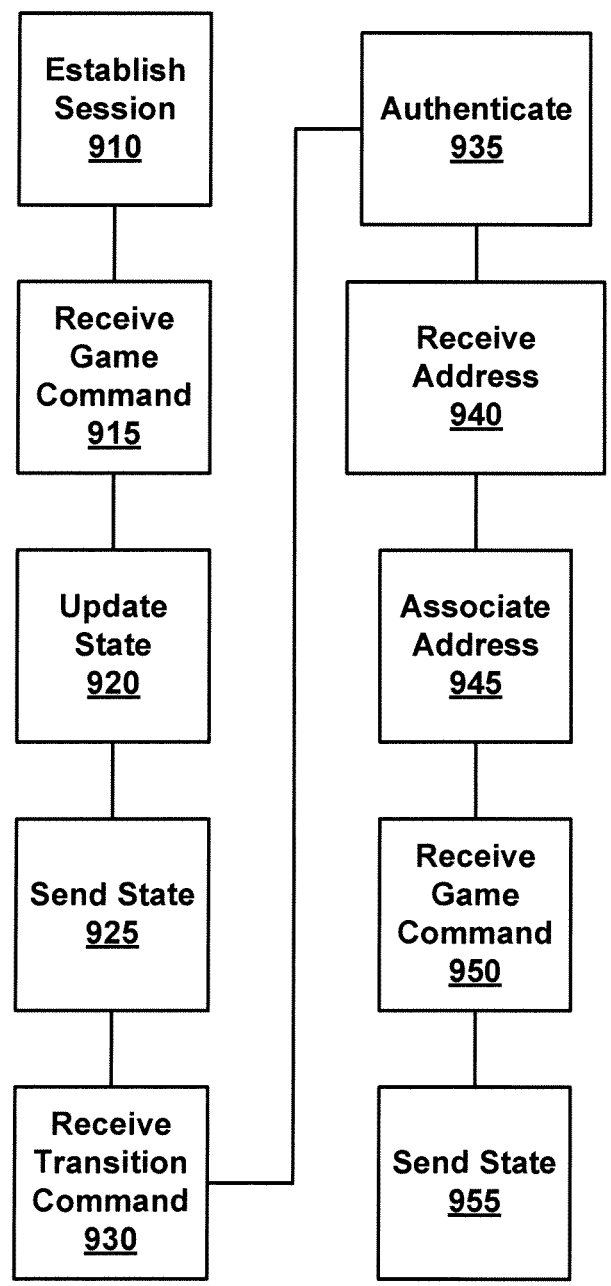
FIG. 9 illustrates methods of transferring a game session, according to various embodiments of the invention.

FIG. 9 illustrates methods of transferring a game session, according to various embodiments of the invention. The game session is transferred from a first client to a second client (e.g., from Video Server System 120 to Client 110B) of Game Server 125. These methods are optionally performed by Game Server 125 in order for a computer game to be played in both the streaming mode and client mode during the same game session. The methods illustrated in FIG. 9 can allow the mode to be changed without requiring that a game player terminate a first game session and manually log in to Game Server 125 to establish a second game session. Alternatively, the methods may facilitate the mode change by provide an appropriate login screen for the game player to log into a second game session. Steps similar to those illustrate in FIG. 9 can be used to transfer the game session back from Client 110B to Video Server System 120. The steps illustrated in FIG. 9 are optionally performed in alternative orders.

In an optional Establish Session Step 910 a game session is established for communicating game commands and game state information between Game Server 125 and a first client, such as Video Server System 120. Establishing a game session is described more fully elsewhere herein. In some embodiments, Game Server 125 requires an account in order to establish the game session. The account can be established automatically or by the game player as described elsewhere herein. The established game session includes identifying addresses of the first client and Game Server 125. As part of the game session, game commands are sent from the first client to Gamer Server 125 and game state information is sent from the Game Server 125 to the first client. Establish Session Step 910 is optional in embodiments where a game session is already established.

In a Receive Game Command Step 915, Game Server 125 receives a game command from the first client. For example, in some embodiments, Game Server 125 receives the game command from Video Server System 120. This game command may have originally been sent by Client 110B to Video Server System 120. At Video Server System 120 the game command is typically used to update the copy of the game state used to render the video stream provided to Client 110B and/or is processed or otherwise modified before being forwarded to Game Server 125. Receipt of the game command is part of the game session established between Game Server 125 and Video Server System 120. As such, the received game command is associated with this particular game session. The association is optionally made using an address or other identifier within the data packet in which the game command is received.

In an Update State Step 920 Game Server 125 uses the game command received from the first client to update a game state. The updated state may be stored on Video Server System 120 and/or Game Server 125. The update is typically performed using game rules stored on Game Server 125.

In a Send State Step 925 the Game Server 125 sends the updated game state of the computer game as a first game state from the game server to the first client. For example, the first game state may be sent to the Video Server System 120. In some embodiments, Send State Step 925 includes sending an initial first game state and then sending updates to the first game state over time. Alternatively, Send State Step 925 can include sending a single first game state to the Video Server System 120.

In a Receive Transition Command Step 930 Game Server 125 receives a command to transition a game session from the first client to the second client. This change in clients results in a change between the streaming mode and the client mode of game play. The command is typically sent by Transition Logic 180, e.g., Transition Logic 180A. The received command places Game Server 125 in a state where it is ready to receive and process information required to perform the transition. In response to the transition command, Game Server 125 is prepared to receive game commands from a second client rather than or in addition to the first client, e.g., from Client 110B instead of Video Server System 120. Examples of the second client include Clients 110 (e.g., Client 110A or 110B). In Receive Transition Command Step 930, Game Server 125 is also prepared to send state updates to the second client rather than or in addition to the first client.

In an optional Authenticate Step 935 the command to transition received in Receive Transition Command Step 930 is authenticated. This authentication can be accomplished in a variety of ways. For example, in some embodiments the received transition command is encrypted and/or includes authentication codes configured to prevent unauthorized reassignment of a game session. In some embodiments, Game Server 125 includes a list of authorized IP addresses and is configured to only accept transition commands from the IP addresses in this list. The IP addresses from which the transition command is received is optionally confirmed using a handshaking routine. In a specific example, Game Server 125 is configured to accept transition commands from a limited set of addresses including an IP (or MAC) address of Video Server System 120, and to not accept transition commands from addresses not in this limited set. The authentication of Authenticate Step 935 optionally includes use of decryption keys, or any of the various message authentication schemes known in the art.

In a Receive Address Step 940, Game Server 125 receives an IP address (or other type of network address) of the second client. For example, Transition Logic 180A may provide an IP address of Client 110B to Game Server 125 and may instruct Game Server 125 (via the Transition Logic 180B) to send game commands directly to Client 110B. Optionally, Receive Address Step 940 also includes providing an address of Game Server 125 to Client 110. For example, Transition Logic 180A and/or Transition Logic 180B may provide an IP address of Game Server 125 to Client 110B and may instruct Client 110B (via the Transition Logic 180C) to send game commands directly to the IP address of Game Server 125 instead of, or in addition to, the IP address Video Server System 120. Commands received from Video Server System 120 are typically identified by the IP address of Video Server System 120 and Commands received from Client 110B are typically identified by the IP address of Client 110B, although other identifiers can be used. The instructions provided to Game Server 125 thus optionally include an IP address (or other type of network address) of Client 110B.

In an Associate Address Step 945, the address of the second client is associated with the game session such that a second state of the computer game will be sent to the second client and/or such that a game command received from the second client will be associated with the game session. At Game Server 125, Transition Logic 180B associates the received second client IP address with a particular game session. For example, at Game Server 125, Transition Logic 180B receives the IP address of Client 110B and associates it with the requested game session. Future game states are then sent to the IP address of Client 110B in addition to, or instead of, the IP address of Video Server System 120. A game session can at one time be associated with an IP address of Video Server System 120 and at another time the same game session can be associated with an IP address of Client 110B. Optionally this game session is associated with both IP addresses for some time. Association between an IP address and a game session is meant to indicate that the game session uses the IP address to send game states and/or to identify received game commands as being for that game session.

In an optional Receive Game Command Step 950, a game command is received from the second client and the address of the second client is used to identify the received game command as being for the particular game session. The game command received in Receive Game Command Step 950 is optionally the same type of game command as the game command received in Receive Game Command Step 915. Game server 125 receives the game command from Client 110B over a communication system including the Network 115. Client 110B optionally sends the game command to the IP address of Game Server 125, instead of the IP address of Video Server System 120. Game Server 125 receives the game command from the IP address of Client 110B that has been provided in the Associate Address Step 945, instead of from the IP address of Video Server System 120. Game Server 125 uses the IP address of Client 110B to associate the received game command with the game session of the game player. This association of the received game command is made even when the game session and login were initially established via Video Server System 120. In alternative embodiments, identifier(s) other than the IP addresses are used to associate the received game commands with a game session. For example, a session identifier may be included with the game command. This session identifier can be established when the game session starts or when a game player logs in.

Some aspects of Receive Game Command Step 950 are optional in embodiments wherein game commands continue to be received by Game Server 125 from Client 110B via Video Server System 120 in the client mode.

In a Send State Step 955, the second state of the computer game is sent to the second client. The Game Server 125 optionally uses the game command received in Receive Game Command Step 950 to determine the second state of the computer game. The second state of the computer game is optionally sent to the IP address of Client 110B instead of or in addition to the IP address of Video Server System 120.

In alternative embodiments, Video Server System 120 is configured to operate as a proxy server when the game is played in the client mode. In these embodiments, the second state of the computer game is sent to Client 110B via Video Server System 120. As a proxy server, Video Server System 120 merely forwards game commands and game states to the appropriate destinations. The process can be transparent to Game Server 125. For example, Game Server 125 can continue to send game states to and/or receive commands from Video Server System 120 after the game play is transitioned to the client mode. Likewise, Client 110B can continue to send game commands to video server system 120 and/or receive game states from Video Server System 120. However, as discussed elsewhere herein, in the client mode the majority of the game video displayed on Client 110B is rendered on Client 110B. In these embodiments, Video Server System 120 is configured to re-address received game commands and game states and send them on to the appropriate destinations. If the modes are changed back to the streaming mode from the client mode, Video Server System 120 begins to generate and provide the streaming video again and uses the received game command to update a local copy of the game state used to render the streaming video.

In the various examples above, the first client is described as a local client (e.g., Video Server System 120) and the second client is described as a remote client (e.g., Client 110B). However, in some embodiments, the first client is Client 110B and the second client is Video Server System 120. Thus, the transition illustrated by FIG. 9 can be performed from streaming mode to client mode or from client mode to streaming mode. Video Server System 120 is optionally configured to authenticate Client 110B, and/or determine if Client 110B is capable of operating in the client mode for a particular video game.

In some embodiments, when transitioning from the client mode to the streaming mode, Game Server 125 receives the game command from Client 110B in the Receive Game Command Step 915 via Network 115. Game Server 125 also sends the game state via the network 115 to Client 110B in the Send State Step 925. In the Receive Transition Command Step 930 Game Server 125 receives a command to transition from the client mode to the streaming mode of the computer game. Communication is transitioned from Client 110B to Video Server System 120 during various steps including the Receive Transition Command Step 930, the Receive Address Step 940, the Authenticate Step 935, and the Associate Address Step 945. In the optional Authenticate Step 935 the command to transition from the client mode to the streaming mode is authenticated. Upon transitioning to the streaming mode, Game Server 125 receives a game command from Video Server System 120 in the Receive Game Command 950. A second game state may be determined based on the received game command. Game Server 125 sends the second game state to Video Server System 120 in the Send State Step 955.

In some embodiments, Communication between Game Server 125 and Client 110B or Video Server System 1120 can be transitioned back and forth from Video Server System 120 to Client 110B and from Client 110B to Video Server System 120, as the game session repeatedly transitions back and forth between streaming mode and client mode. Thus, Client 110B can exchange roles repeatedly with Video Server System 120 during the game session. Likewise, Video Server System 120 can exchange roles repeatedly with Client 110B as the client of Game Server 125 during the game session.

Several embodiments are specifically illustrated and/or described herein. However, it will be appreciated that modifications and variations are covered by the above teachings and within the scope of the appended claims without departing from the spirit and intended scope thereof. For example, the systems and methods discussed herein can be applied to computer programs other than games. These other types of computer programs can include graphics programs, spreadsheets, word processors, database programs, accounting programs, project management programs, video editing programs, image editing programs, website development programs, inventory programs, e-mail programs, file management programs, document management/viewing programs, drawing/computer aided design programs, presentation programs, and/or the like. While the server side mode and the client side mode are discussed herein as separate modes of game delivery, in some embodiments these modes can be combined. For example, part of the video presented to the game player can be streamed from Video Server System 120 while another part of the video can be generated on Client 110B. In different modes of game play the parts and/or ratio of the streamed verses locally generated video can change. For example, some game events may include more streamed video than other game events.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

Computing systems referred to herein can comprise an integrated circuit, a microprocessor, a personal computer, a server, a distributed computing system, a communication device, a network device, or the like, and various combinations of the same. A computing system may also comprise one or more computer-readable media including volatile and/or non-volatile memory such as random access memory (RAM), dynamic random access memory (DRAM), static random access memory (SRAM), magnetic media, optical media, nano-media, a hard drive, a compact disk, a digital versatile disc (DVD), and/or other devices configured for storing analog or digital information, such as in a database. The various examples of logic noted above can comprise hardware, firmware, or software stored on a computer-readable medium, or combinations thereof. A computer-readable medium, as used herein, expressly excludes paper and carrier waves. Computer-implemented steps of the methods noted herein can comprise a set of instructions stored on a computer-readable medium that when executed cause the computing system to perform the steps. A computing system programmed to perform particular functions pursuant to instructions from program software is a special purpose computing system for performing those particular functions. Data that is manipulated by a special purpose computing system while performing those particular functions is at least electronically saved in buffers of the computing system, physically changing the special purpose computing system from one state to the next with each change to the stored data.

What is claimed is:

1. A method for server-to-client transmission of data, comprising:
    transmitting both a first type of data and a second type of data through a communication channel from a server computer system to a client computer system, wherein the first type of data includes streaming video data for a video game, wherein the second type of data includes executable code defined for execution by the client computer system to generate video data for the video game for use at the client computer system in lieu of the streaming video data, and wherein the second type of data includes game state data for the video game and user saved data for the video game;
    monitoring a transmission parameter of the communication channel; and
    controlling an amount of the second type of data transmitted through the communication channel in accordance with a monitored state of the transmission parameter, the controlling causing a decrease in the amount of the second type of data transmitted through the communication channel when the monitored state of the transmission parameter reaches a threshold value indicating an unacceptable condition associated with transmission of the first type of data through the communication channel.

2. The method as recited in claim 1, wherein the transmission parameter is a latency in transmission of data through the communication channel from the server computer system to the client computer system.

3. The method as recited in claim 1, wherein the transmission parameter is an amount of available communication bandwidth for transmission of data through the communication channel from the server computer system to the client computer system.

4. The method as recited in claim 1, wherein the controlling causes an increase in the amount of the second type of data transmitted through the communication channel when the monitored state of the transmission parameter has not reached the threshold value indicating the unacceptable condition associated with transmission of the first type of data through the communication channel.

5. The method as recited in claim 1, wherein the threshold value of the transmission parameter is set to ensure that streaming video data for the video game is delivered to the client computer system with a prescribed level of quality.

6. The method as recited in claim 5, wherein the prescribed level of quality includes one or more of a reliability of display at a specified resolution of video defined by the streaming video data, a color depth of video defined by the streaming video data, and a frame size of video defined by the streaming video data.

7. The method as recited in claim 1, wherein both the first type of data and the second type of data are associated with a same computer game.

8. The method as recited in claim 1, wherein the communication channel is a common communication channel through which both the first type of data and the second type of data are transmitted.

9. The method as recited in claim 1, further comprising:
    maintaining the game state data for the video game corresponding to the streaming video data for the video game; and
    maintaining the user saved data for the video game.

10. The method as recited in claim 9, further comprising:
    determining that an executable amount of executable code for generating video data for the video game has been transmitted as the second type of data from the server computer system to the client computer system;
    having the game state data and the user saved data at the client computer system;
    executing the executable amount of executable code at the client computer system to generate video data for the video game at the client computer system; and
    using the video data for the video game generated at the client computer system and the streaming video data for the video game from the server computer system to render video for the video game at the client computer system.

11. The method as recited in claim 10, further comprising:
    stopping transmission of the streaming video data for the video game from the server computer system to the client computer system; and
    including executable code within the first type of data upon stopping transmission of the streaming video data for the video game from the server computer system to the client computer system.

12. The method as recited in claim 10, further comprising:
transmitting additional game state data and user saved data from the server computer system to the client computer system upon determining that the executable amount of executable code has been transmitted from the server computer system to the client computer system.

13. A method for server-to-client transmission of data, comprising:
generating a series of data packets, each data packet including a data payload, the data payload of a given data packet including an amount of a first type of data and an amount of a second type of data;
transmitting the series of data packets through a communication channel from a server computer system to a client computer system, wherein the first type of data includes streaming video data for a video game, wherein the second type of data includes executable code for the video game defined for execution by the client computer system to generate video data for the video game for use at the client computer system in lieu of the streaming video data, and wherein the second type of data includes game state data for the video game and user saved data for the video game;
monitoring a transmission parameter of the communication channel; and
upon determining that a monitored state of the transmission parameter has reached a threshold value indicating an unacceptable condition associated with transmission of the first type of data from the server computer system to the client computer system, decreasing the amount of the second type of data included in the data payload of subsequently generated data packets in the series of data packets and correspondingly increasing the amount of the first type of data included in the data payload of subsequently generated data packets in the series of data packets.

14. The method as recited in claim 13, wherein the transmission parameter is a latency in transmission of the series of data packets through the communication channel from the server computer system to the client computer system.

15. The method as recited in claim 13, wherein the transmission parameter is an amount of available communication bandwidth for transmission of the series of data packets through the communication channel from the server computer system to the client computer system.

16. The method as recited in claim 13, further comprising:
upon determining that the monitored state of the transmission parameter has not reached the threshold value indicating the unacceptable condition associated with transmission of the first type of data from the server computer system to the client computer system, increasing the amount of the second type of data included in the data payload of subsequently generated data packets in the series of data packets and correspondingly decreasing the amount of the first type of data included in the data payload of subsequently generated data packets in the series of data packets.

17. The method as recited in claim 13, wherein the threshold value of the transmission parameter is set to ensure that streaming video data for the video game is delivered to the client computer system with a prescribed level of quality.

18. The method as recited in claim 17, wherein the prescribed level of quality includes one or more of a reliability of display at a specified resolution of video defined by the streaming video data, a color depth of video defined by the streaming video data, and a frame size of video defined by the streaming video data.

19. The method as recited in claim 13, wherein both the first type of data and the second type of data are associated with a same computer game.

20. The method as recited in claim 13, further comprising:
maintaining the game state data for the video game corresponding to the streaming video data for the video game;
maintaining the user saved data for the video game;
determining that an executable amount of executable code for generating video data for the video game has been transmitted as the second type of data from the server computer system to the client computer system;
transmitting the game state data and the user saved data from the server computer system to the client computer system as the second type of data;
executing the executable amount of executable code at the client computer system to generate video data for the video game at the client computer system; and
stopping transmission of the streaming video data for the video game from the server computer system to the client computer system.

* * * * *